United States Patent
Yamazaki et al.

(10) Patent No.: US 8,306,720 B2
(45) Date of Patent: Nov. 6, 2012

(54) POWER OUTPUT APPARATUS, VEHICLE EQUIPPED WITH THE SAME, AND METHOD OF CONTROLLING POWER OUTPUT APPARATUS

(75) Inventors: Makoto Yamazaki, Gotenba (JP); Shunsuke Fushiki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 819 days.

(21) Appl. No.: 12/471,545

(22) Filed: May 26, 2009

(65) Prior Publication Data

US 2009/0292449 A1 Nov. 26, 2009

(30) Foreign Application Priority Data

May 23, 2008 (JP) ................... 2008-135065

(51) Int. Cl.
*G06F 19/00* (2011.01)
*F02D 41/14* (2006.01)
*F02M 33/02* (2006.01)
*F02M 25/08* (2006.01)
*B60K 1/02* (2006.01)

(52) U.S. Cl. ............ 701/103; 123/520; 123/698; 477/3; 701/110

(58) Field of Classification Search .................. 123/520, 123/673, 674, 698; 701/101–103, 109, 110; 477/3; 903/905
See application file for complete search history.

(56) References Cited

U.S. PATENT DOCUMENTS

| | | | | |
|---|---|---|---|---|
| 5,351,193 A * | 9/1994 | Poirier et al. | ........... | 123/520 |
| 5,371,412 A | 12/1994 | Iwashita et al. | | |
| 5,465,703 A * | 11/1995 | Abe | ........... | 123/698 |
| 5,778,859 A * | 7/1998 | Takagi | ........... | 123/520 |
| 6,257,218 B1 * | 7/2001 | Takagi et al. | ........... | 123/698 |
| 6,453,887 B1 * | 9/2002 | Hayashi et al. | ........... | 123/520 |
| 7,775,195 B2 * | 8/2010 | Schondorf et al. | ........... | 123/520 |
| 7,967,720 B2 * | 6/2011 | Martin et al. | ........... | 123/520 |
| 8,104,454 B2 * | 1/2012 | Schondorf et al. | ........... | 123/520 |

FOREIGN PATENT DOCUMENTS

| | | |
|---|---|---|
| JP | 06233410 | 8/1994 |
| JP | 2000282969 | 10/2000 |
| JP | 2007210536 | 8/2007 |

* cited by examiner

*Primary Examiner* — Willis R Wolfe, Jr.
(74) *Attorney, Agent, or Firm* — Gifford, Krass, Sprinkle, Anderson & Citkowski, P.C.

(57) ABSTRACT

In a power output apparatus, when the fuel vapor concentration is high and the target purge rate is high, an operating point on a purge priority operating line is selected as a target operating point of an engine. As a result, the intake manifold negative pressure greater than that when an operating point on an optimum fuel efficiency operating line is selected, so that the flow rate of purge gas released from a canister is increased. When the fuel vapor concentration does not fall within a high-concentration range, the necessity to immediately purge fuel vapor trapped in the canister into the intake pipe is low, and thus an operating point on the optimum fuel efficiency operating line is selected to keep the engine operating at high fuel efficiency.

8 Claims, 11 Drawing Sheets

PURGE RATE Rp =
PURGE GAS AMOUNT / INTAKE AIR AMOUNT Ga

POWER OUTPUT APPARATUS, VEHICLE EQUIPPED WITH THE SAME, AND METHOD OF CONTROLLING POWER OUTPUT APPARATUS

INCORPORATION BY REFERENCE

The disclosure of Japanese Patent Application No. 2008-135065 filed on May 23, 2008, including the specification, drawings and abstract, is incorporated herein by reference in its entirety.

BACKGROUND OF THE INVENTION

1. Field of the Invention

The invention relates to a power output apparatus, a vehicle on which the power output apparatus is installed, and a method of controlling the power output apparatus.

2. Description of the Related Art

A conventional power output apparatus includes an engine; a fuel tank in which fuel that is supplied to the engine is stored; a canister that traps fuel vapor in the fuel tank and allows the trapped fuel vapor to be purged into the intake pipe of the engine; an electric motor that generates power to drive a drive shaft; a planetary gear that is connected to three shafts, i.e., the output shaft of the engine, a drive shaft and a rotary shaft, and is arranged to transfers power between the three shafts based on power received from or supplied to two of the three shafts; and a generator that generates electric power using the power received from the rotary shaft of the planetary gear. The power output apparatus of this type performs so-called purge control by causing the canister to trap fuel vapor generated in the fuel tank, and purging the fuel vapor trapped in the canister, along with outside air, into the intake pipe, utilizing a negative pressure in the intake pipe. In a hybrid vehicle as described in Japanese Patent Application Publication No. 6-233410, when the weight of the canister exceeds a prescribed weight while the engine is at rest, and the vehicle is running, the engine is operated to carry out purge control to appropriately dispose of the fuel vapor trapped in the canister.

When the absolute value of the intake manifold negative pressure is equal to zero or close to zero, such as when the throttle valve of the engine is fully open, only a small amount of purge gas (a mixed gas of fuel vapor trapped in the canister and outside air) flows into the intake pipe, even if a purge control valve provided in a purge passage connecting the canister with the intake pipe is fully opened. Therefore, when a large amount of fuel vapor are trapped in the canister, it unfavorably takes a long period of time to purge the fuel vapor. Nevertheless, it is undesirable to employ a technology for solving this problem that would negatively impact the fuel economy of the engine.

SUMMARY OF THE INVENTION

The present invention provides a power output apparatus that purges a large amount of fuel vapor trapped by a fuel vapor trap in a relatively short time, without significantly affecting the fuel economy of an internal combustion engine. The invention also provides a vehicle equipped with the power output apparatus, and a method of controlling the power output apparatus.

According to one aspect of the invention, a power output apparatus is provided which includes an internal combustion engine, a fuel tank in which fuel to be supplied to the internal combustion engine is stored, a fuel vapor trap that traps fuel vapor in the fuel tank, and allows the trapped fuel vapor to be purged into an intake pipe of the internal combustion engine, an electric motor that outputs power to a drive shaft, a three-shaft power input and output device that is connected to three shafts comprising an output shaft of the internal combustion engine, the drive shaft and a rotary shaft, and is operable to supplies or receives power to or from one of the three shafts, based on power supplied to or received from the remaining two of the three shafts, a generator that generates electric power using the power received via the rotary shaft, a detector that detects a parameter associated with a fuel vapor amount as an amount of fuel vapor trapped in the fuel vapor trap, a required power setting device, a target operating point setting device, and a controller. The required power setting device sets a required power that is required to be transmitted to the drive shaft. When a purge priority condition that comprises at least a condition that the parameter associated with the fuel vapor amount and detected by the detector falls within a specified high-fuel-amount range is satisfied, the target operating setting device sets a target operating point of the internal combustion engine to a purge priority operating point at which the internal combustion engine generates the same power as when the engine operates at an optimum fuel efficiency operating point, at which the engine operates at optimum fuel efficiency, but operates at a higher rotational speed with smaller torque. When a certain purge priority canceling condition is satisfied after the target operating point of the internal combustion engine is set to the purge priority operating point, the target operating setting device sets the target operating point of the internal combustion engine to the optimum fuel efficiency operating point. The controller controls the internal combustion engine, the electric motor and the generator, based on the set required power and the target operating point of the internal combustion engine, and executes purge control for purging the fuel vapor trapped by the fuel vapor trap into the intake pipe, utilizing a negative pressure of the intake pipe.

In the power output apparatus as described above, the required power that is required to be transmitted to the drive shaft is set. Also, when a purge priority condition that comprises at least a condition that the parameter associated with the fuel vapor amount detected by the detector falls within a specified high-fuel-amount range is satisfied, the target operating point of the internal combustion engine is set to a purge priority operating point at which the engine generates the same power but operates at a higher rotational speed with smaller torque, as compared with those of the engine operating at an optimum fuel efficiency operating point at which the engine operates at optimum fuel efficiency. When a certain purge priority canceling condition is satisfied after the target operating point of the internal combustion engine is set to the purge priority operating point, the target operating point of the internal combustion engine is set to the optimum fuel efficiency operating point. Then, the internal combustion engine, the electric motor and the generator are controlled based on the set required power and the target operating point of the internal combustion engine while purge control is carried out. Namely, when the purge priority condition is satisfied, the purge priority operating point is selected so that the absolute value of the intake manifold negative pressure becomes larger than that in the case where the optimum fuel efficiency operating point is selected, and the flow rate of gas (purge gas) purged from the fuel vapor trap into the intake pipe can be increased. As a result, the fuel vapor trapped in the fuel vapor trap are immediately purged into the intake pipe. When the purge priority canceling condition is satisfied, on the other hand, the necessity to immediately purge the fuel vapor trapped in the fuel vapor trap into the intake pipe is low;

therefore, the optimum fuel efficiency operating point is selected so as to keep the engine operating at high fuel efficiency. Thus, when a large amount of fuel vapor are trapped in the fuel vapor trap, it is possible to purge the fuel vapor in a reduced time without significantly affecting the fuel economy of the internal combustion engine.

The fuel economy or fuel efficiency as mentioned above may be represented by the fuel consumption rate, which indicates the amount of fuel consumed by the internal combustion engine when it does a certain amount of work. This term is used in conjunction with general power machines that are not limited to automobiles. The above statement that "the parameter associated with the fuel vapor amount detected by the detector falls within the specified high-fuel-amount range" means that fuel vapor are trapped in the fuel vapor trap in an amount equal to or close to a saturation level. Here, examples of the parameter include, for example, a concentration of fuel vapor in purge gas, and an amount of fuel vapor trapped by the fuel vapor trap.

In the power output apparatus as described above, the purge priority condition may comprise at least a condition that the parameter associated with the fuel vapor amount and detected by the detector falls within the specified high-fuel-amount range, and a ratio of a purge gas flow to an intake air flow (i.e., the flow rate of intake air or intake air mass flow) falls within a specified high-ratio range. When the ratio of the purge gas flow to the intake air mass flow does not fall within the specified high-ratio range, the necessity to increase the purge gas flow is not so high even if the parameter associated with the fuel vapor amount falls within the specified high-fuel-amount range. In this case, therefore, an optimum fuel efficiency operating point is selected so as to give a higher priority to improvement of the fuel efficiency.

To determine the above-mentioned high-ratio range, the maximum value of the ratio of the purge gas flow to the intake air mass flow may be obtained by experiment, or the like, and the lower limit of the high-ratio range may be set to a value obtained by multiplying the maximum value by a factor (<1, for example, 0.9 or 0.8).

In the power output apparatus as described above, the purge priority canceling condition may comprise at least a condition that a total purge gas amount calculated from the time when the target operating point of the internal combustion engine is set to the purge priority operating point falls within a specified large-amount range. Alternatively, the purge priority canceling condition may comprise at least a condition that the parameter associated with the fuel vapor amount and detected by the detector does not fall within the specified high-fuel-amount range. When the above-indicated purge priority canceling condition is satisfied, a sufficient amount of fuel vapor trapped in the fuel vapor trap are presumed to have been purged into the intake pipe by means of the purge gas.

To determine the above-mentioned specified large-amount range, when purge gas is caused to flow while fuel vapor are trapped in the fuel vapor trap in an amount equal to or close to a saturation level, a total amount of the purge gas with which the parameter associated with the fuel vapor falls outside the specified high-fuel-amount range is obtained by experiment, or the like, and the thus obtained value is set as the lower limit of the large-amount range.

In the power output apparatus as described above, the detector may detect a fuel concentration in purge gas as the parameter associated with the fuel vapor amount. Alternatively, the detector may detect the amount of fuel vapor trapped in the fuel vapor trap, as the parameter associated with the fuel vapor amount.

The power output apparatus according to the above aspect of the invention may further include an operating line storage device that stores an optimum fuel efficiency operating line on which the internal combustion engine is operable at optimum fuel efficiency, and a purge priority operating line, as operating lines used for setting an operating point representing the rotational speed and torque of the internal combustion engine. The internal combustion engine operates at a higher rotational speed with smaller torque at a given operating point on the purge priority operating line so as to generate a certain power, as compared with those of the engine operating at a given operating point on the optimum fuel efficiency operating line so as to generate the same power. The target operating setting device may set the target operating point of the internal combustion engine to an operating point on the purge priority operating line when the purge priority condition is satisfied, and may set the target operating point of the internal combustion engine to an operating point on the optimum fuel efficiency operating line when the purge priority canceling condition is satisfied. With this arrangement, a load imposed on the controller is reduced as compared with the case where the target operating point of the internal combustion engine is obtained each time through calculation, or the like, without using the operating lines as described above.

According to another aspect of the invention, there is provided a vehicle on which the power output apparatus according to any of the above-described forms of the invention is installed, and which has an axle coupled to the drive shaft. Since the power output apparatus according to any of the above forms of the invention is installed on the vehicle, the vehicle yields advantageous effects provided by the power output apparatus. For example, when a large amount of fuel vapor are trapped in the fuel vapor trap, the fuel vapor can be purged or released in a reduced time, without significantly affecting the fuel economy of the internal combustion engine.

According to a further aspect of the invention, there is provided a method of controlling a power output apparatus, which is implemented by computer software, wherein the power output apparatus includes an internal combustion engine, a fuel tank in which fuel to be supplied to the internal combustion engine is stored, a fuel vapor trap that traps fuel vapor in the fuel tank, and allows the trapped fuel vapor to be purged into an intake pipe of the internal combustion engine, an electric motor that outputs power to a drive shaft, a three-shaft power input and output device that is connected to three shafts comprising an output shaft of the internal combustion engine, the drive shaft and a rotary shaft, and supplies or receives power to or from one of the three shafts, based on power supplied to or received from the remaining two of the three shafts, a generator that generates electric power using the power received via the rotary shaft, and a fuel vapor detector that detects a parameter associated with a fuel vapor amount as an amount of fuel vapor trapped in the fuel vapor trap. According the method of controlling, a required power that is required to be transmitted to the drive shaft is set, and a target operating point of the internal combustion engine is set to a purge priority operating point, at which the internal combustion engine generates the same power as when the engine operates at an optimum fuel efficiency operating point, at which the engine operates at optimum fuel efficiency, but operates at a higher rotational speed with smaller torque, when a purge priority condition that includes at least a condition that the parameter associated with the fuel vapor amount that is detected by the detector falls within a specified high-fuel-amount range is satisfied. When a purge priority canceling condition is satisfied after the target operating point of the internal combustion engine is set to the purge priority operating point, the target operating point of the internal combustion engine is set to the optimum fuel efficiency operating point. The internal combustion engine, the electric motor and the generator are controlled, based on the set required power and the target operating point of the internal combustion engine, when purge control to purge the fuel vapor trapped by the fuel vapor trap into the intake pipe, utilizing a negative pressure of the intake pipe, is executed.

According to the method of controlling of the power output apparatus, the required power that is required to be transmitted to the drive shaft is set. Also, when a purge priority condition that comprises at least a condition that the parameter associated with the fuel vapor amount and detected by the detector falls within the specified high-fuel-amount range is satisfied, the target operating point of the internal combustion engine is set to a purge priority operating point at which the engine generates the same power but operates at a higher rotational speed with smaller torque, as compared with those of the engine operating at an optimum fuel efficiency operating point at which the engine operates at optimum fuel efficiency. When a certain purge priority canceling condition is satisfied after the target operating point of the internal combustion engine is set to the purge priority operating point, the target operating point of the internal combustion engine is set to the optimum fuel efficiency operating point. Then, the internal combustion engine, the electric motor and the generator are controlled based on the set required power and the target operating point of the internal combustion engine, while purge control is carried out. Namely, when the purge priority condition is satisfied, the purge priority operating point is selected so that the absolute value of the intake manifold negative pressure becomes larger than that in the case where the optimum fuel efficiency operating point is selected, and the flow rate of purge gas can be increased. As a result, the fuel vapor trapped in the fuel vapor trap are immediately purged into the intake pipe. When the purge priority canceling condition is satisfied, on the other hand, the necessity to immediately purge the fuel vapor trapped in the fuel vapor trap into the intake pipe is low; therefore, the optimum fuel efficiency operating point is selected so as to keep the internal combustion engine operating at high fuel efficiency. Thus, when a large amount of fuel vapor are trapped in the fuel vapor trap, the fuel vapor can be purged in a reduced time without significantly affecting the fuel economy of the internal combustion engine. The function(s) of the power output apparatus according to any of the above-described forms of the invention may be implemented as a step or steps of the method of controlling of the power output apparatus of the invention.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
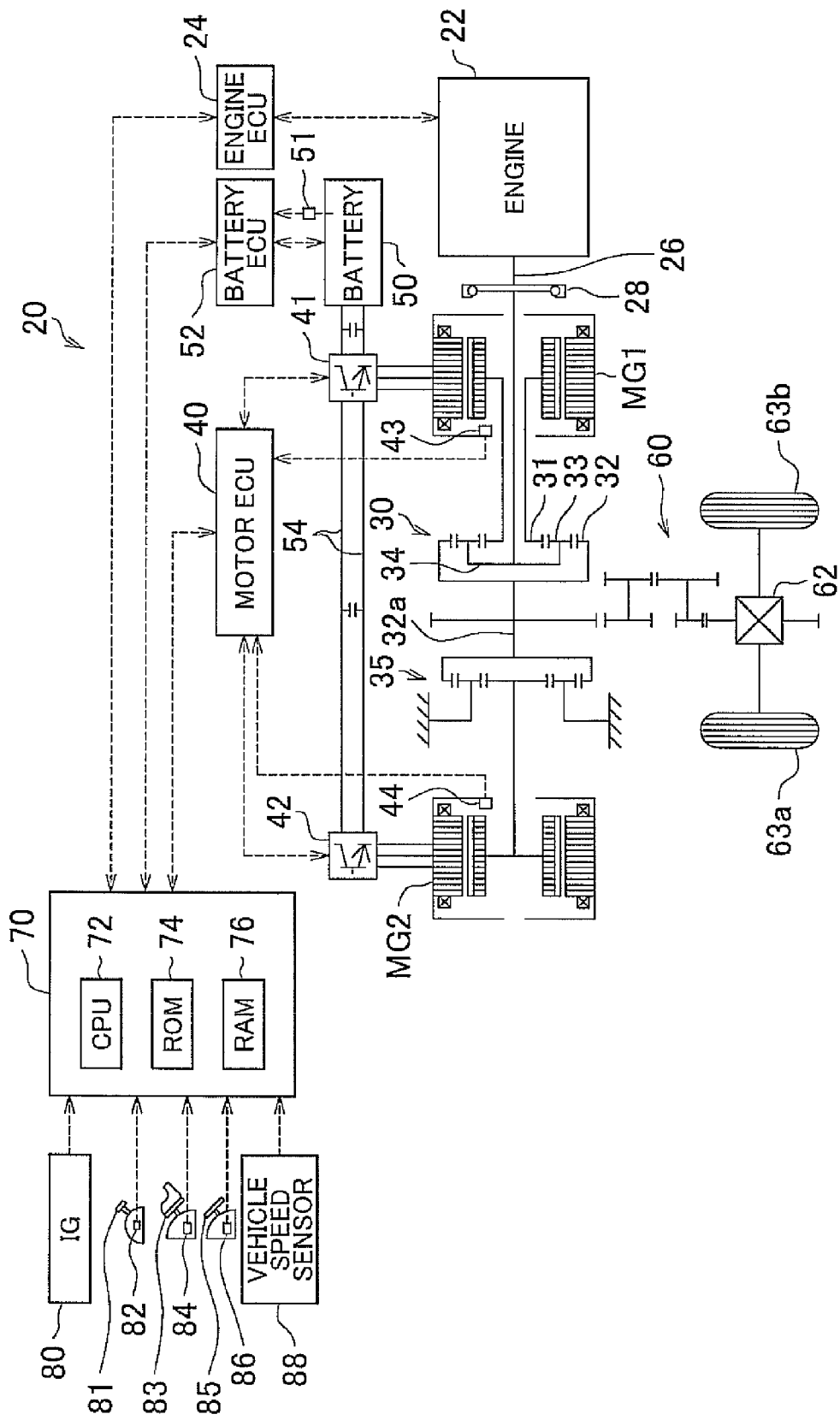
FIG. 1 is a schematic view of the construction of a hybrid vehicle on which a power output apparatus according to one embodiment of the invention is installed.

An example embodiment of the invention will be described. FIG. 1 is a schematic view of the construction of a hybrid vehicle or hybrid car 20 equipped with a power output apparatus according to an embodiment of the invention. As shown in FIG. 1, the hybrid vehicle 20 includes an engine 22, a three-shaft-type power distribution/integration mechanism 30 connected to a crankshaft 26 of the engine 22 via a damper 28, a motor MG1 that is connected to the power distribution/integration mechanism 30 and is configured to generate electric power, a reduction gear 35 mounted on a ring gear shaft 32$a$ as a drive shaft connected to the power distribution/integration mechanism 30, a motor MG2 connected to the reduction gear 35, and a hybrid-system electronic control unit 70 that controls the overall power output apparatus.

Figure 2:
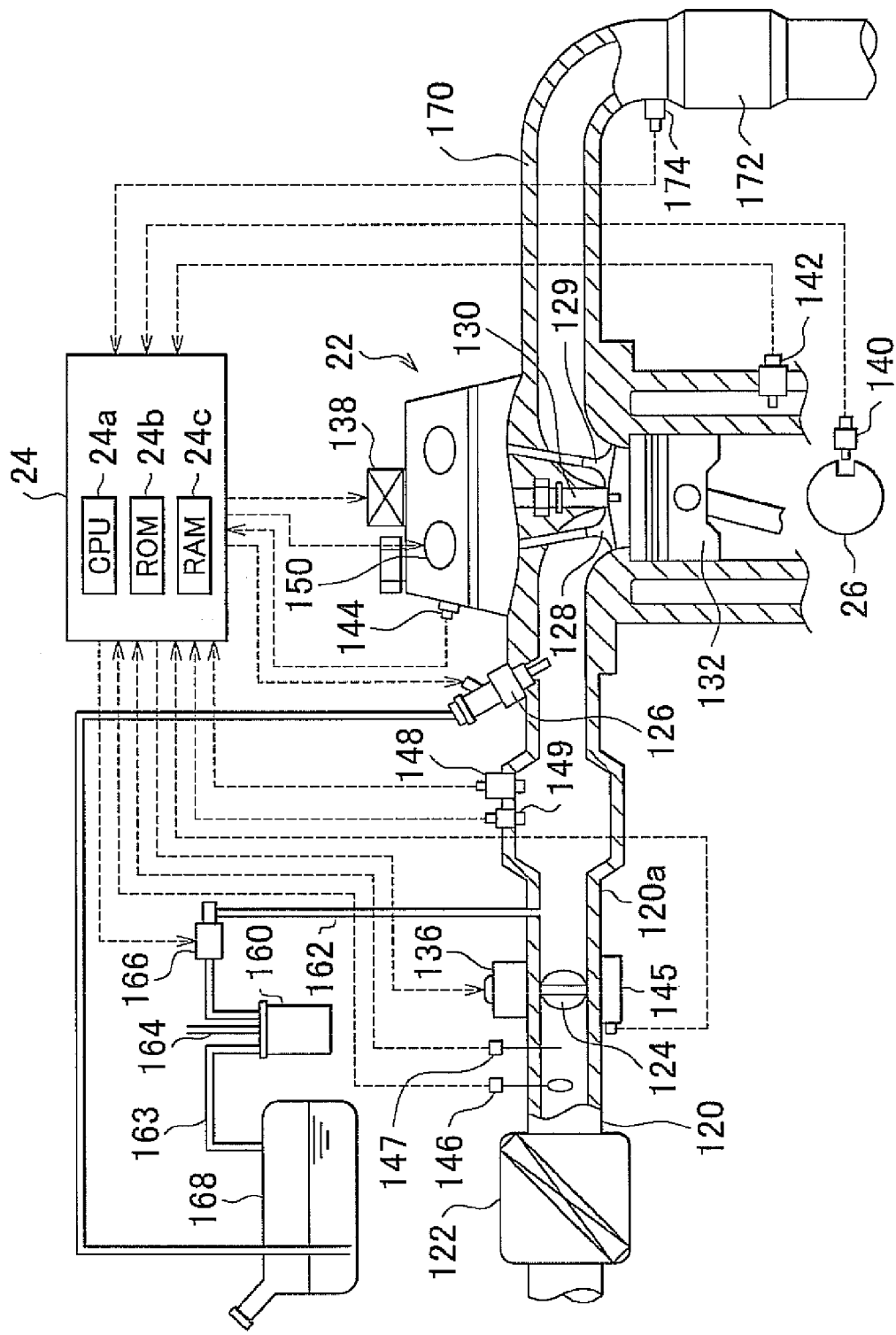
FIG. 2 is a view of the construction of an engine shown in FIG. 1.

The engine 22 is connected to an intake passage 120 and an exhaust passage 170, as shown in FIG. 2. An air cleaner 122, a throttle valve 124 for controlling the flow rate of air passing through the air cleaner 122, and a fuel injection valve or injector 126 for injecting fuel into an intake port located in the vicinity of an intake valve 128 of the engine 22 are mounted in the intake passage 120. In this embodiment, the portion of the intake passage 120 downstream of the throttle valve 124 will be called "intake pipe 120$a$". The intake pipe 120$a$ is connected to a canister 160 via a purge passage 162. The canister 160 receives fuel vapor generated in a fuel tank 168 from which fuel is supplied to the fuel injection valve 126, via a vapor passage 163, and an adsorbent, such as activated carbon, contained in the canister 160 is adapted to adsorb the fuel vapor from the fuel tank 168. When a negative pressure or vacuum appears in the intake pipe 120$a$ during operation of the engine 22, outside air flows into the canister 160 through an atmosphere inlet 164, and purge gas, a mixture of the fuel desorbed from the adsorbent and the outside air, is released into the intake pipe 120a via the purge passage 162. A purge vacuum switching valve (VSV) 166 serving as a purge control valve is provided in the purge passage 162, and the opening/closing of the purge VSV 166 is duty-controlled so that the flow rate of the purge gas released into the intake pipe 120a is controlled. An emission control device 172 incorporating a three-way catalyst for removing or converting pollutants, i.e., carbon monoxide (CO), hydrocarbon (HC) and nitrogen oxides (NOx), and an air-fuel ratio sensor 174 for detecting the air-fuel ratio (A/F) of exhaust at the upstream side of the emission control device 172 are mounted in the exhaust passage 170. In the engine 22 constructed as described above, a mixture of air that has passed through the air cleaner 122, purge gas that has passed through the purge passage 162 and the fuel injected from the fuel injection valve 126 is drawn into a combustion chamber via the intake valve 128, and is combusted by a spark produced by an ignition plug 130, so that a piston 132 is pushed down with the energy produced upon explosion/combustion. The resultant reciprocating motion of the piston 132 is converted into rotary motion of the crankshaft 26. When the purge VSV 166 is closed, a mixture of the air that has passed through the air cleaner 22 and the fuel injected from the fuel injection valve 126 is drawn into the combustion chamber. The exhaust is discharged from the engine 22 into the exhaust passage 170 via an exhaust valve 129, and is then released to the outside of the vehicle after being cleaned when passing through the emission control device 172.

An engine ECU 24 is configured as a microprocessor having CPU 24a as a main component; and further includes ROM 24b that stores control programs; RAM 24c that temporarily stores data; and input/output ports and communication port (not shown). The engine ECU 24 receives signals from various sensors for detecting conditions of the engine 22, via the input port. For example, the engine ECU 24 receives the engine speed from a crank position sensor 140 for detecting the rotational position of the crankshaft 26, coolant temperature from a water temperature sensor 142 for detecting the temperature of the coolant of the engine 22, cam position from a cam position sensor 144 for detecting the rotational position of a camshaft that opens and closes the intake valve 128 and exhaust valve 129 for allowing drawing of air into the combustion chamber and discharge of exhaust from the combustion chamber, throttle opening from a throttle valve position sensor 145 for detecting the opening of the throttle valve 124, intake air mass flow from a hot-wire-type air flow meter 146 mounted in the intake passage 120, intake air temperature from a temperature sensor 147 also mounted in the intake passage 120, intake manifold pressure from a silicon-diaphragm-type intake manifold pressure sensor 148 mounted in the intake pipe 120a, intake-air oxygen signal from an intake-air oxygen sensor 149 mounted in the intake pipe 120a, and the air-fuel ratio from the air-fuel ratio sensor 174. In addition, various control signals for driving the engine 22 are generated from the ECU 24 via the output port. For example, the ECU 24 transmits a drive signal to the fuel injection valve 126, drive signal to a throttle motor 136 for varying the opening of the throttle valve 124, control signal to an ignition coil 138 integral with an igniter, control signal to a variable valve timing mechanism 150 capable of changing the opening/closing timing of the intake valve 128, and a drive signal to the purge VSV 166. The engine ECU 24 communicates with the hybrid-system electronic control unit 70, and controls the operation of the engine 22 in accordance with control signals from the hybrid-system electronic control unit 70, while transmitting data concerning the operating conditions of the engine 22 as needed.

The power distribution/integration mechanism 30 is a planetary gear train that has a sun gear 31 as an external gear, a ring gear 32 as an internal gear, and a carrier 34, as rotary elements, which are operable in a differential fashion. The sun gear 31 and the ring gear 32 are disposed concentrically with each other, and the carrier 34 holds a plurality of pinion gears 33 that mesh with the sun gear 31 and also mesh with the ring gear 32, such that the pinion gears 33 can rotate about themselves and can rotate about the same axis. In the power distribution/integration mechanism 30, the crankshaft 26 of the engine 22 is coupled to the carrier 34, and the motor MG1 is coupled to the sun gear 31, while the reduction gear 35 is coupled to the ring gear 32 via the ring gear shaft 32a. When the motor MG1 operates as a generator, power transmitted from the engine 22 to the carrier 34 is distributed to the sun gear 31 side and the ring gear 32 side according to the gear ratio thereof. When the motor MG1 operates as an electric motor, the power transmitted from the engine 22 to the carrier 34 and power transmitted from the motor MG1 to the sun gear 31 are combined or integrated, and transmitted to the ring gear 32 side. The power transmitted to the ring gear 32 is finally transmitted to vehicle drive wheels 63a, 63b, via the ring gear shaft 32a, gear mechanism 60 and a differential gear 62.

The motor MG1 and the motor MG2 are both in the form of conventional synchronous motor-generators each capable of operating as a generator and also operating as an electric motor, and are arranged to supply and receive electric power to and from a battery 50 via inverters 41, 42. A power line 54 that connects the inverters 41, 42 with the battery 50 consists of a positive bus and a negative bus which are shared by the inverters 41, 42, and electric power generated by one of the motors MG1, MG2 may be consumed by the other motor. Accordingly, the battery 50 may be charged with electric power generated by either of the motors MG1, MG2, and may discharge or supply electric power to either the motors MG1, MG2. If the amounts of electric power supplied to and received from the motor MG1 are balanced with those of the motor MG2, neither charging nor discharging of the battery 50 will occur. An electronic control unit for motors (which will be called "motor ECU") 40 controls driving of the motors MG1, MG2. The motor ECU 40 receives signals necessary to control the motors MG1, MG2, for example, signals from rotational position sensors 43, 44 for detecting the rotational positions of rotors of the motors MG1, MG2, and phase currents applied to the motors MG1, MG2 and detected by current sensors (not shown). The motor ECU 40 sends switching control signals to the inverters 41, 42. The motor ECU 40 communicates with the hybrid-system electronic control unit 70, and controls the driving of the motors MG1, MG2 according to control signals from the hybrid-system electronic control unit 70 while transmitting data concerning operating conditions of the motors MG1, MG2 to the hybrid-system electronic control unit 70 as needed.

The battery 50 is managed or controlled by an electronic control unit for the battery (which will be called "battery ECU") 52. The battery ECU 52 receives signals necessary to manage the battery 50. For example, the battery ECU 52 receives a voltage between terminals of the battery 50 from a voltage sensor (not shown) installed between the terminals, charge/discharge current from a current sensor (not shown) mounted in the power line 54 connected to the output terminal of the battery 50, battery temperature Tb from a temperature sensor 51 mounted on the battery 50, and so forth. The battery ECU 52 transmits data concerning the status of the battery 50 to the hybrid-system electronic control unit 70 via communications, as needed. The battery ECU 52 calculates the state of charge (SOC) of the battery 50, for use in control of the battery 50, based on a total value of charge/discharge current detected by the current sensor.

The hybrid-system electronic control unit 70 is configured as a microprocessor having CPU 72 as a main component, and further includes ROM 74 that stores control programs, RAM 76 that temporarily stores data, and input/output ports and communication port (not shown). The hybrid-system electronic control unit 70 receives, via the input port, an ignition signal from an ignition switch 80, shift position SP from a shift position sensor 82 for detecting a position to which a shift lever 81 is operated, an accelerator depression amount. Acc from an accelerator pedal position sensor 84 for detecting the amount of depression of an accelerator pedal 83, brake pedal position BP from a brake pedal position sensor 86 for detecting the amount of depression of a brake pedal 85, vehicle speed V from a vehicle speed sensor 88, and so forth. The hybrid-system electronic control unit 70 is connected to the engine ECU 24, motor ECU 40, and the battery ECU 52, via the communication port, as described above, and transmits and receives various control signals and data to and from the engine ECU 24, motor ECU 40 and the battery ECU 52.

In the hybrid vehicle 20 of this embodiment, the required torque to be applied to the ring gear shaft 32*a* as the drive shaft is calculated based on the accelerator depression amount. Acc corresponding to the amount by which the accelerator pedal 83 is depressed, and the vehicle speed V, and the operations of the engine 22, motor MG1 and the motor MG2 are controlled so that the required power corresponding to the required torque is transmitted to the ring gear shaft 32*a*. Control Modes of operation of the engine 22, motor MG1 and the motor MG2 include, for example, a torque conversion operating mode, a charge/discharge operating mode, and a motor operating mode. In the torque conversion operating mode, the engine 22 is controlled so that the engine 22 produces power equivalent to the required power, and the motor MG1 and the motor MG2 are controlled so that the entire power generated from the engine 22 is converted into torque by means of the power distribution/integration mechanism 30 and the motor MG1 and motor MG2, and the torque is applied to the ring gear shaft 32*a*. In the charge/discharge operating mode, the engine 22 is controlled so that the engine 22 produces power equivalent to the sum of the required power and electric power needed for charge/discharge of the battery 50, and the motor MG1 and the motor MG2 are controlled so that the entire power or a part of the power generated from the engine 22 with the battery 50 put on charge/discharge is converted into torque by means of the power distribution/integration mechanism 30 and the motor MG1 and motor MG2, and the required power is transmitted to the ring gear shaft 32*a*. In the motor operating mode, the operation of the engine 22 is stopped, and the motor MG2 is controlled so that the power equivalent to the required power is transmitted from the motor MG2 to the ring gear shaft 32*a*.

Figure 3:
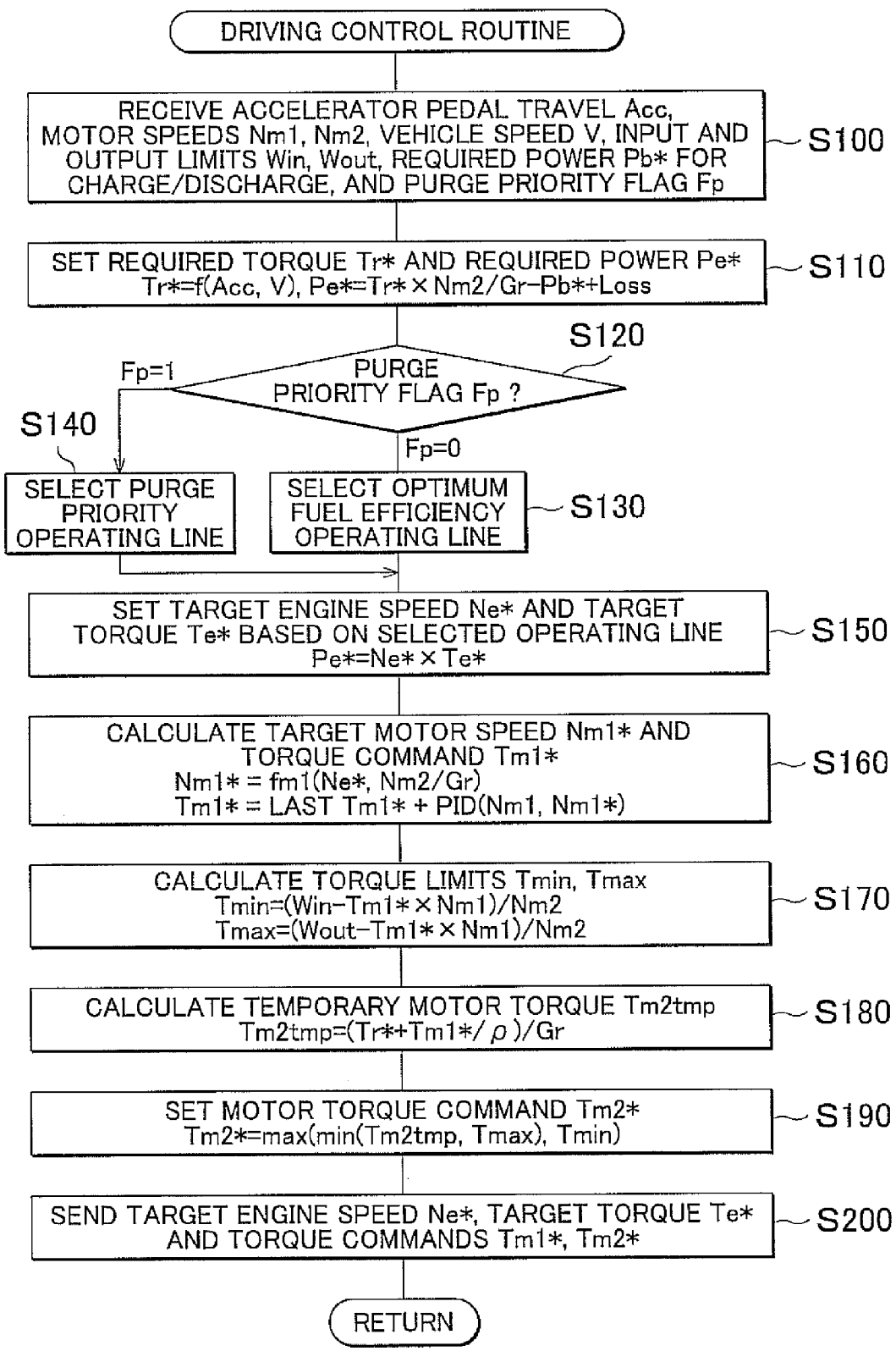
FIG. 3 is a flowchart illustrating a driving control operation executed by a hybrid-system electronic control unit of the embodiment of FIG. 1.

Next, the operation of the hybrid vehicle 20 of this embodiment constructed as described above will be described. FIG. 3 is a flowchart illustrating one example of driving control operation executed by the hybrid-system electronic control unit 70. The operation of FIG. 3 is executed at predetermined intervals (of, for example several milliseconds).

Figure 4:
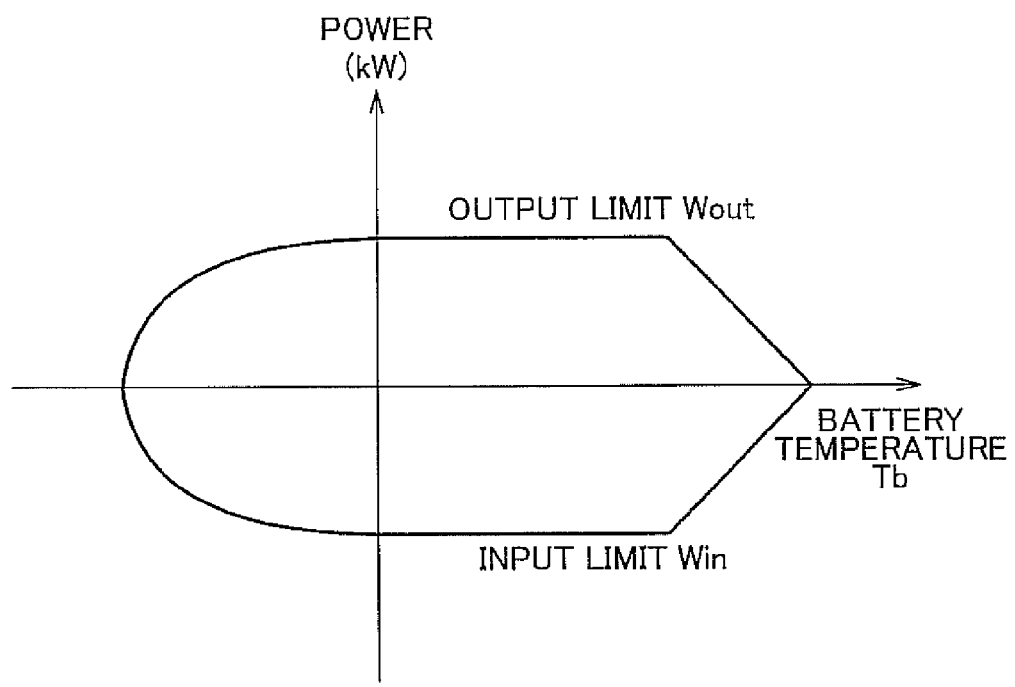
FIG. 4 is an explanatory view of the relationships between the battery temperature, and the input limit and the output limit, with regard to a battery shown in FIG. 1.
Figure 5:
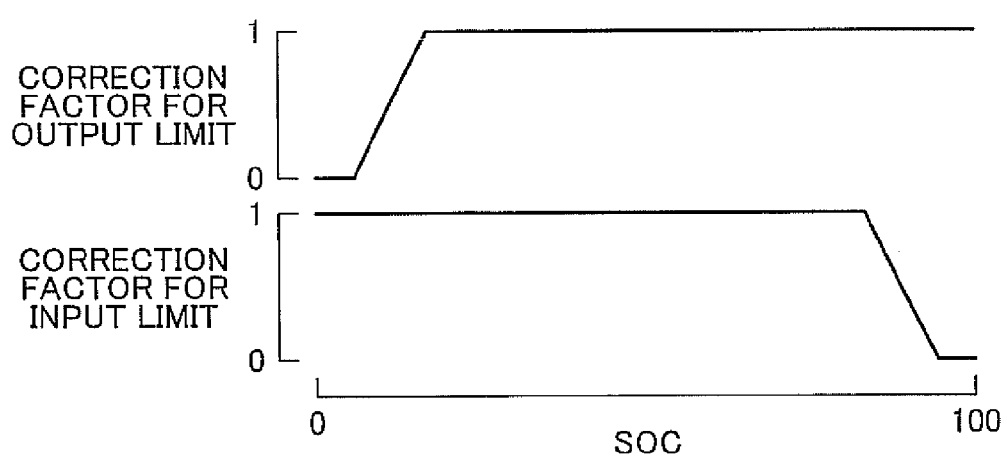
FIG. 5 is an explanatory view that shows the relationships between the state of charge (SOC) of the battery shown in FIG. 1, and correction factors for the input limit and the output limit.

When the driving control operation is executed, the CPU 72 of the hybrid-system electronic control unit 70 receives data necessary to control the hybrid vehicle 20 (S100). For example, the CPU 72 receives the accelerator depression amount. Acc from the accelerator pedal position sensor 84, vehicle speed V from the vehicle speed sensor 88, rotational speeds Nm1, Nm2 of the motors MG1, MG2, input and output limits Win, Wout of the battery 50, required power Pb* for charge/discharge of the battery 50 (which takes a positive value when discharged and takes a negative value when the battery 50 is charged), and a value of a purge priority flag Fp which indicates whether purge control takes priority over the fuel efficiency. Here, the rotational speeds Nm1, Nm2 of the motors MG1, MG2 are calculated based on the rotational positions of the rotors of the motors MG1, MG2 detected by the rotational position sensors 43, 44. The hybrid-system electronic control unit 70 receives the thus calculated rotational speeds Nm1, Nm2 from the motor ECU 40 via communications. The input and output limits Win, Wout are set based on the battery temperature Tb of the battery 50 detected by the temperature sensor 51 and the state of charge (SOC) of the battery 50. The hybrid-system electronic control unit 70 receives the set input and output limits Win, Wout from the battery ECU 52 via communications. The input and output limits Win, Wout of the battery 50 can be set by setting the basic values of the input and output limits Win, Wout based on the battery temperature Tb, setting a correction factor for the output limit and a correction factor for the input limit based on the state of charge (SOC) of the battery 50, and multiplying the set basic values of the input and output limits Win, Wout by the respective correction factors. FIG. 4 shows an example of the relationship between the battery temperature Tb and the input and output limits Win, Wout, and FIG. 5 shows an example of the relationship between the state of charge (SOC) of the battery 50 and the correction factors for the input and output limits Win, Wout. The required power Pb* for charge/discharge of the battery 50 is set based on the state of charge (SOC) of the battery 50, and is transmitted from the battery ECU 52 to the hybrid-system electronic control unit 70 via communications. The value of the purge priority flag Fb is transmitted from the engine ECU 24 to the hybrid-system electronic control unit 70 via communications.

Figure 6:
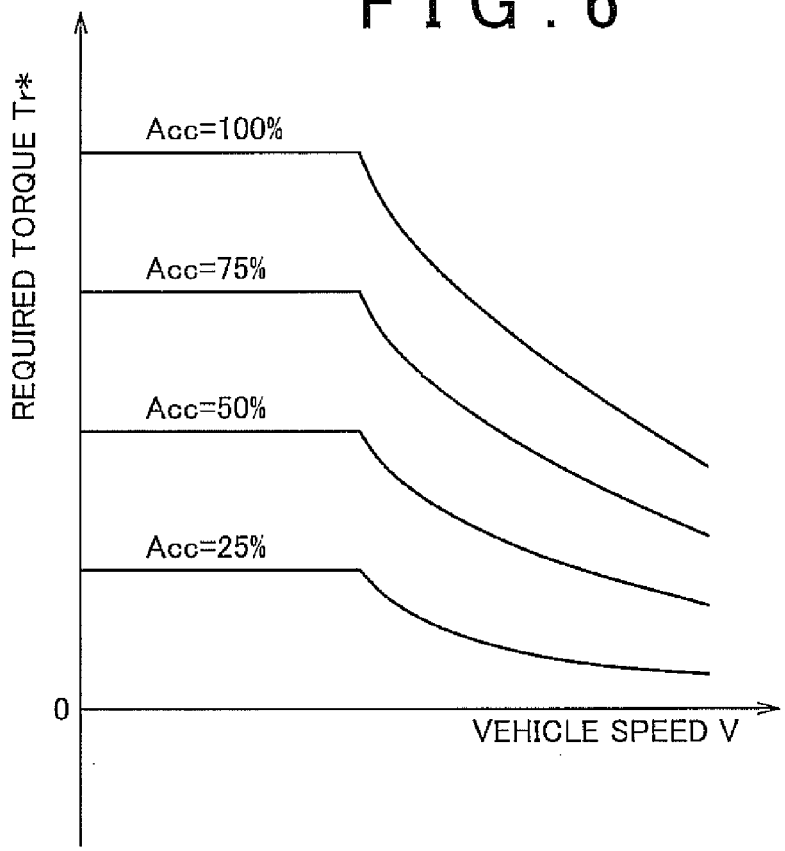
FIG. 6 is an explanatory view showing an example of map for setting required torque.

After receiving the data in the above manner, the CPU 72 of the hybrid-system electronic control unit 70 sets the required torque Tr* to be applied to the ring gear shaft 32*a* as the drive shaft coupled to the driving wheels 63*a*, 63*b*, as torque required of the vehicle, and the required power Pe* required of the engine 22, based on the accelerator depression amount. Acc and the vehicle speed V (step S110). In this embodiment, the relationships among the accelerator depression amount. Acc, vehicle speed V and the required torque Tr* are predetermined and stored in the ROM 74 as a map used for setting the required torque. When the accelerator depression amount. Acc and the vehicle speed V have been received, the required torque Tr* corresponding to the received pedal travel and vehicle speed is derived from the stored map. FIG. 6 shows an example of a map for setting the required torque. The required power Pe* may be calculated based on the product of the set required torque Tr* and the rotational speed Nr of the ring gear shaft 32*a*, the required power Pb* for charge/discharge of the battery 50, and a loss Loss. The rotational speed Nr of the ring gear shaft 32*a* may be obtained by multiplying the vehicle speed V by a conversion factor k, or may be obtained by dividing the rotational speed Nm2 of the motor MG2 by the gear ratio Gr of the reduction gear 35.

Figure 7:
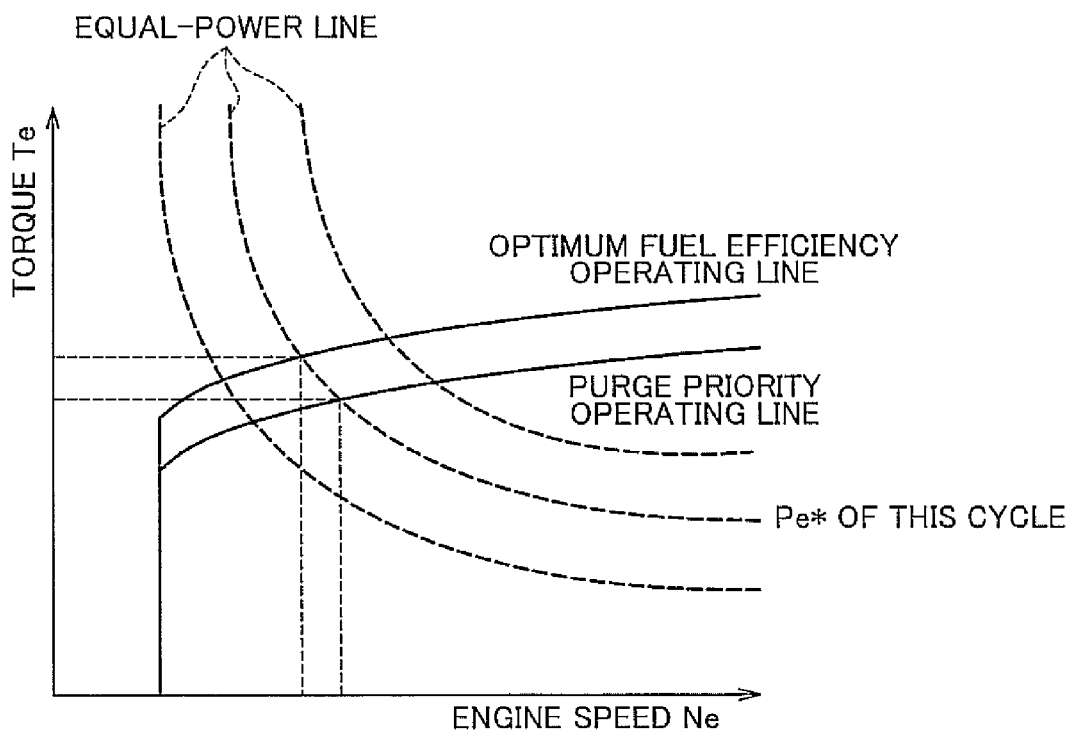
FIG. 7 is an explanatory view showing an example of optimum fuel efficiency operating line and purge priority operating line of the engine shown in FIG. 1.

Subsequently, the value of the purge priority flag Fp is checked (step S120). The purge priority flag Fp indicates whether purge control, i.e., control for purging fuel vapor trapped by the canister 160 into the intake pipe 120*a*, along with outside air flowing through the atmosphere inlet 164, utilizing the intake manifold negative pressure, needs to be performed in the engine 22, with higher priority than the optimization of the fuel efficiency. When the value of the purge priority flag Fp is 1, the execution of the purge control needs to be prioritized. If the value of the purge priority flag Fp is 0, the execution of the purge control does not need to be prioritized. The purge priority flag Fp is set by the engine ECU 24 in a manner as will be described later. Thus, if the value of the purge priority flag Fp is 0, it is not necessary to increase the absolute value of the intake manifold negative pressure to ensure a sufficiently large flow rate of purge gas, and an optimum fuel efficiency line is selected as the operating line (step S130). If the value of the purge priority flag Fp is 1, on the other hand, it is necessary to place a higher priority on the purge control; therefore, it is preferable to ensure a sufficiently large flow rate of purge gas by increasing the absolute value of the intake manifold negative pressure, and a purge priority line is selected as the operating line (step S140). The optimum fuel efficiency line is obtained by plotting or connecting operating points at which the engine operates at optimum fuel efficiency, each selected from an equal-power line (on which the power is constant), as shown in FIG. 7. The optimum fuel efficiency line is set so that the fuel efficiency is optimized to the greatest extent possible, no matter how small the absolute value of the intake manifold negative pressure. On the other hand, the purge priority line is obtained by selecting an operating point having a higher engine speed and smaller torque than those of the operating point providing the optimum fuel efficiency, on each equal-power line, and plotting or connecting such operating points on respective equal-power lines. If the required power Pe* is the same, and the engine 22 is operated at an operating point on the purge priority line, the fuel efficiency is reduced but the engine speed is higher and the torque is lower, than those of the engine operating at an operating point on the optimum fuel efficiency line. As a result, the opening of the throttle valve 124 is reduced, and the absolute value of the intake manifold negative pressure is increased, thus making it possible to increase the flow rate of the purge gas. The above-described operating lines are stored in the ROM 74 of the hybrid-system electronic control unit 70.

After the operating line is selected in step S130 or step S140, a target operating point defined by a target engine speed Ne* and target torque Te* of the engine 22 is set based on the selected operating line (step S150). The target operating point is set using the optimum fuel efficiency line when the optimum fuel efficiency line is selected, the target engine speed Ne* and target torque Te* at this time are set to engine speed and torque corresponding to an intersection between the optimum fuel efficiency line and the equal-power line of the required power Pe* of the current cycle as shown in FIG. 7. The target operating point is set using the purge priority line when the purge priority line is selected, the target engine speed Ne* and target torque Te* at this time are set to engine speed and torque corresponding to an intersection between the purge priority operating line and the equal-power line of the required power Pe* of the current cycle as shown in FIG. 7.

Figure 8:
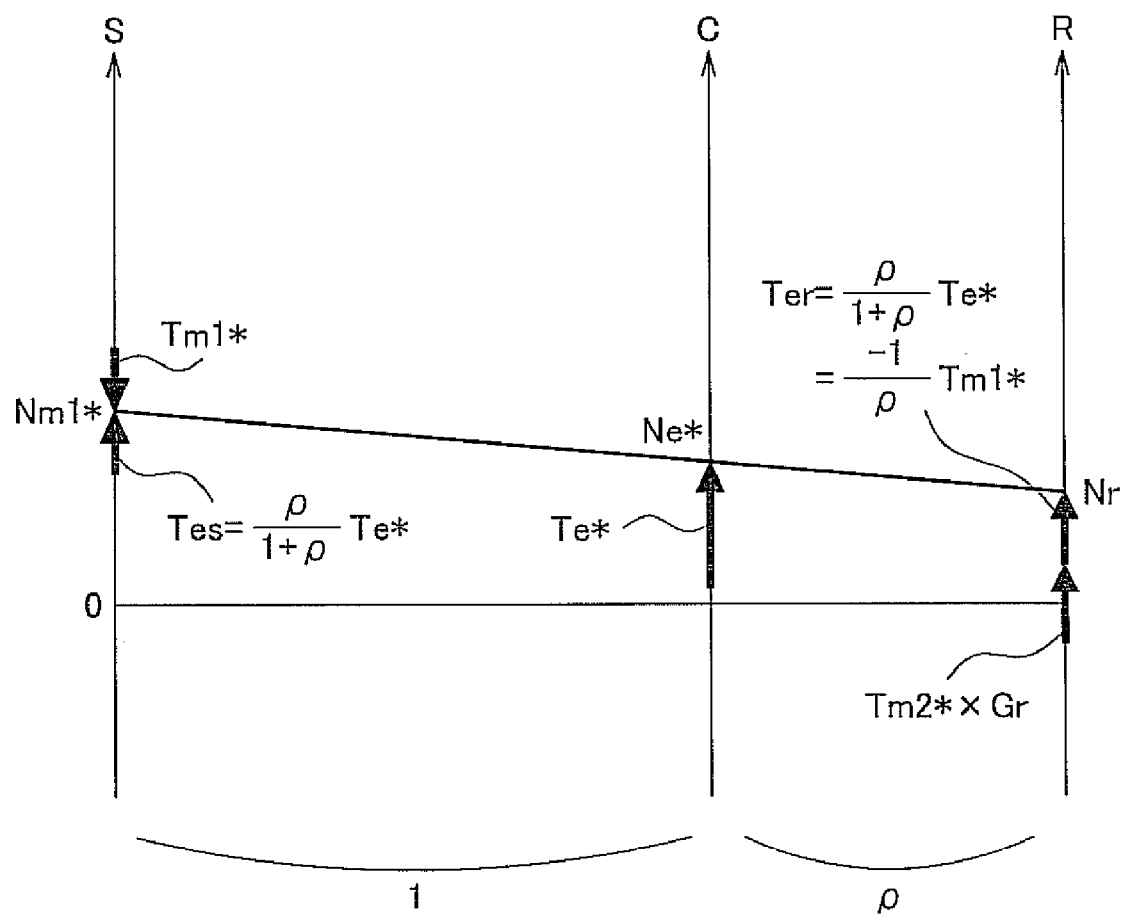
FIG. 8 is an explanatory view in the form of an alignment chart showing the dynamical (or kinetic) relationships in terms of the rotational speed and the torque among rotary elements of a power distribution/integration mechanism shown in FIG. 1.

Next, a target rotational speed Nm1* of the motor MG1 is calculated according to Equation (1) below, using the target engine speed Ne*, rotational speed Nr (=Nm2/Gr) of the ring gear shaft 32a, and the gear ratio ρ of the power distribution/integration mechanism 30, and a torque command Tm1* of the motor MG1 is calculated according to Equation (2) below, based on the calculated target motor speed Nm1* and the current motor speed Nm1 (step S160). Equation (1) represents a dynamical relationship for the rotary elements of the power distribution/integration mechanism 30. FIG. 8 is an alignment chart indicating dynamical relationships in terms of the rotational speed and the torque among the rotary elements of the power distribution/integration mechanism 30. In FIG. 8, the S axis on the left-hand side indicates the rotational speed of the sun gear 31, which is the rotational speed Nm1 of the motor MG1, and the C axis indicates the rotational speed of the carrier 34, which is the rotational speed Ne of the engine 22, while the R axis indicates the rotational speed Nr of the ring gear 32 obtained by multiplying the rotational speed Nm2 of the motor MG2 by the gear ratio Gr of the reduction gear 35. Equation (1) is easily derived from the alignment chart of FIG. 8. In FIG. 8, two thick-line arrows on the R axis represent torque transmitted to the ring gear 32a as the torque Te* is generated from the engine 22 when the engine 22 operates in a steady state at an operating point defined by the target engine speed Ne* and the target torque Te*, and torque applied to the ring gear shaft 32a when the torque Tm2* generated from the motor MG2 is transmitted via the reduction gear 35. In Equation (2) for use in feedback control for rotating the motor MG1 at the target speed Nm1*, "k1" in the second term on the right-hand side is a gain of a proportional term, and "k2" in the third term on the right-hand side is a gain of an integral term.

$$Nm1^* = Ne^* \times (1+\rho)/\rho - Nm2/(Gr \times \rho) \qquad (1)$$

$$Tm1^* = \text{Last } Tm1^* + k1(Nm1^* - Nm1) + k2\int(Nm1^* - Nm1)dt \qquad (2)$$

After the target rotational speed Nm1* of the motor MG1 and the torque command Tm1* are calculated, the torque limits Tmin, Tmax as the upper and lower limits of torque that may be generated from the motor MG2 are calculated according to Equation (3) and Equation (4) below (step S170). Specifically, the torque limit Tmin, Tmax is obtained by dividing a difference between the input or output limit Win, Wout of the battery 50 and electric power consumed (or generated) by the motor G1, which is obtained by multiplying the calculated torque command Tm1* of the motor MG1 by the current speed Nm1 of the motor MG1, by the rotational speed Nm2 of the motor MG2. Subsequently, a temporary motor toque Tm2tmp as torque to be generated from the motor MG2 is calculated according to Equation (5) below, using the required torque Tr*, torque command Tm1* and the gear ratio ρ of the power distribution/integration mechanism 30 (step S180). Then, a torque command Tm2* of the motor MG2 is set as a value to which the temporary motor torque Tm2tmp is limited by the calculated torque limits Tmin, Tmax (step S190). By setting the torque command Tm2* of the motor MG2 in this manner, the required torque Tr* to be applied to the ring gear shaft 32a as the drive shaft can be set as torque that is limited to within the range between the input and output limits Win, Wout of the battery 50. It is to be noted that Equation (5) is easily derived from the above-mentioned alignment chart of FIG. 8.

$$Tmin = (Win - Tm1^* \times Nm1)/Nm2 \qquad (3)$$

$$Tmax = (Wout - Tm1^* \times Nm1)/Nm2 \qquad (4)$$

$$Tm2tmp = (Tr^* + Tm1^*/\rho)/Gr \qquad (5)$$

After the target engine speed Ne* and target torque Te* of the engine 22 and the torque commands Tm1*, Tm2* of the motors MG1, MG2 are set in the above manner, the target engine speed Ne* and target torque Te* of the engine 22 are transmitted to the engine ECU 24, and the torque commands Tm1*, Tm2* of the motors MG1, MG2 are transmitted to the motor ECU 40 (step S200). Then, the driving control operation of FIG. 3 ends. The engine ECU 24, when receiving the target engine speed Ne* and the target torque Te*, performs control operations, such as fuel injection control, ignition timing control, and valve timing varying control, on the engine 22, so that the engine 22 operates at the operating point defined by the target engine speed Ne* and the target torque Te*. Also, the motor ECU 40, when receiving the torque commands Tm1*, Tm2*, performs switching control on switching devices of the inverters 41, 42, so that the motor MG1 is driven according to the torque command Tm1*, and the motor MG2 is driven according to the torque command Tm2*.

Figure 9A:
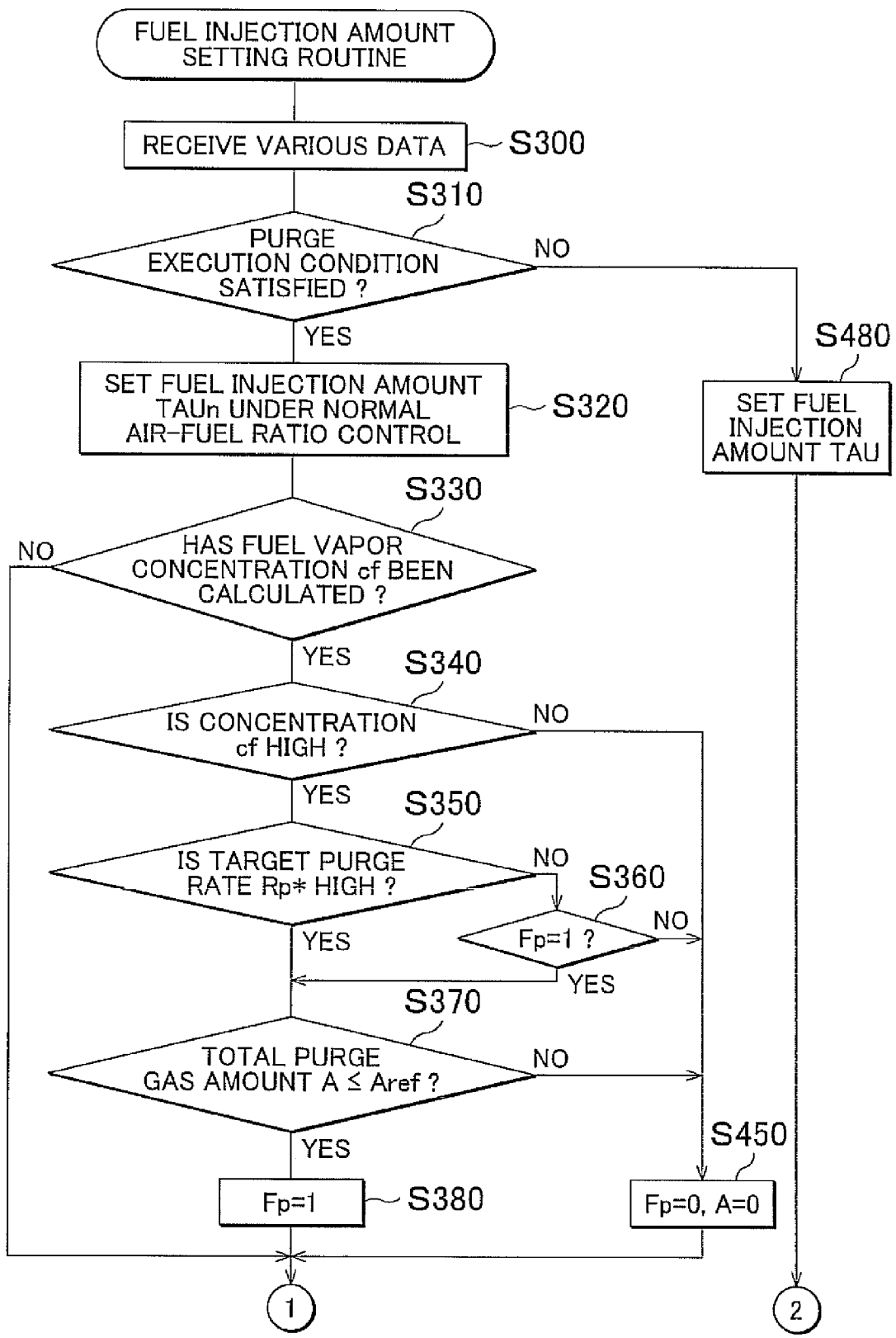
FIG. 9 is a flowchart illustrating a fuel injection amount setting operation executed by an engine ECU shown in FIG. 1 and FIG. 2.
Figure 9B:
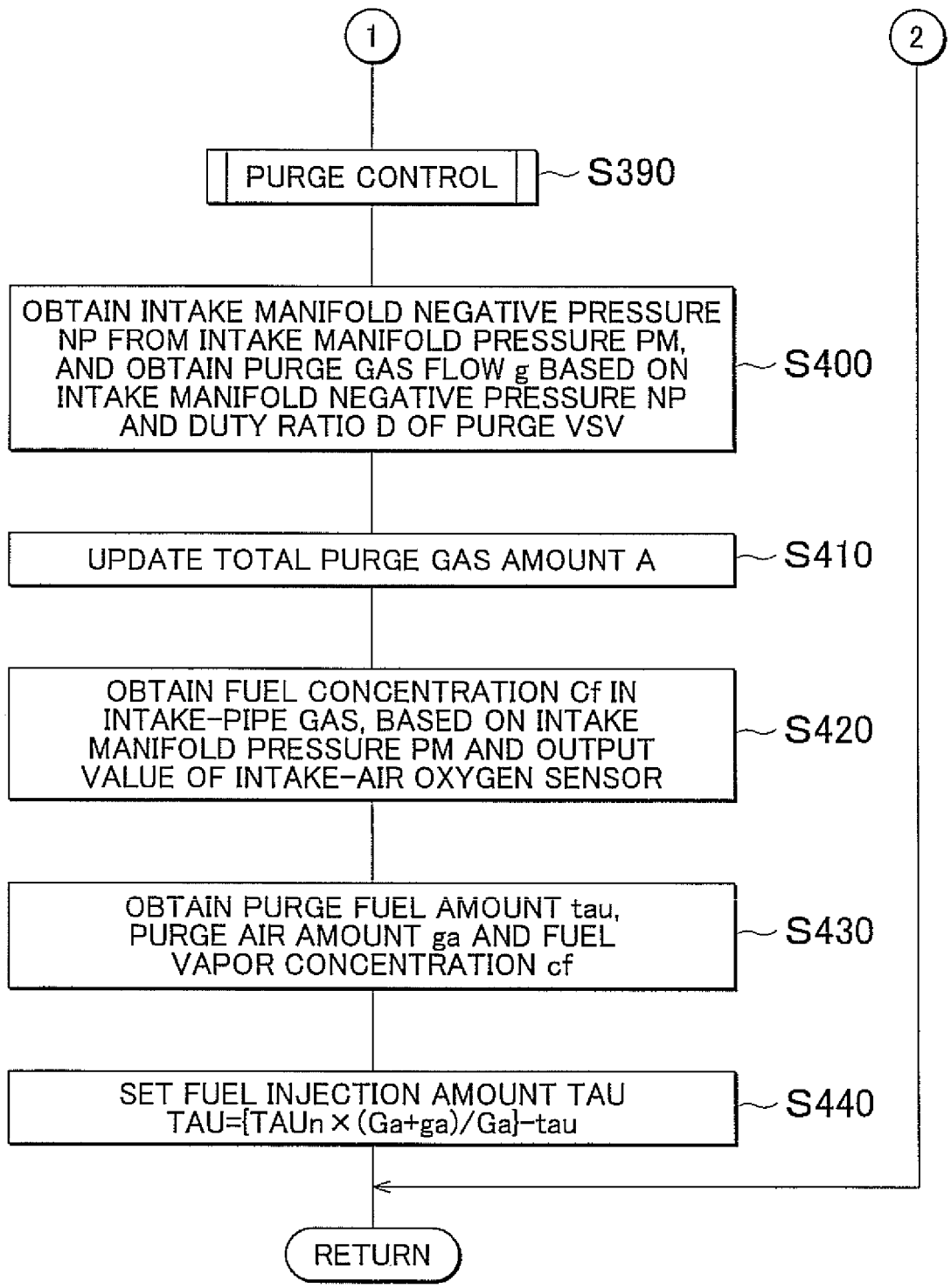

Next, the operating control of the engine 22 executed by the engine ECU 24 when receiving the target engine speed Ne* and the target torque Te*, in particular, the manner of setting the fuel injection amount in view of purge control, will be described. FIG. 9 is a flowchart illustrating an example of fuel injection amount setting operation executed by the engine ECU 24. The operation of FIG. 9 is executed at predetermined time intervals (of, for example, several milliseconds), when the engine 22 is running. The purge priority flag Fp and total purge gas amount A, which appear in the flowchart, are stored in the RAM 24c, and are reset to zero when the engine 22 is stopped or started.

When the fuel injection amount setting operation is executed, the CPU 24a of the engine ECU 24 receives data, such as for example, the intake air mass flow G from the air flow meter 146, engine speed Ne from the crank position sensor 140, intake manifold pressure PM from the intake manifold pressure sensor 148, air-fuel ratio Vaf from the air-fuel ratio sensor 174, and an output value from an intake-air oxygen sensor 149 (step S300). After receiving the various data, the CPU 24a determines whether a purge execution condition is satisfied (step S310). The purge execution condition is a condition under which purge control is executed, if satisfied. In this embodiment, it is determined that the purge execution condition is satisfied when the engine 22 has been warmed up and feedback correction, air-fuel ratio learning correction, etc. are completed.

If the purge execution condition is not satisfied in step S310, the fuel injection amount TAU is set based on the intake air mass flow G detected by the air flow meter 146 and the target air-fuel ratio (e.g., the stoichiometric ratio) (step S480), and the current cycle of this operation ends. The intake air mass flow G detected by the air flow meter 146 is the air mass per unit time. Thus, the intake air amount Ga (=G/Ne) of new air drawn into the intake pipe 120a during one revolution of the engine is obtained by dividing the intake air mass flow G by the engine speed Ne, and the basic injection amount Tp is obtained by multiplying a value obtained by dividing the intake air amount Ga by a target air-fuel ratio Vaf*, by a constant K that is determined depending on, for example, the size of the fuel injection valve 126 and the number of cylinders of the engine 22. The basic injection amount Tp thus obtained is set to the fuel injection amount TAU. The basic injection amount Tp is calculated according to the following Equation (6).

$$Tp=K\times(G/Ne)/Vaf^* \qquad (6)$$

If the purge execution condition is satisfied in step S310, on the other hand, a normal fuel injection amount TAUn is obtained (step S320). The normal fuel injection amount TAUn as the amount of fuel to be injected from the fuel injection valve 126 is obtained by subjecting the basic injection amount TP to air-fuel ratio feedback correction and air-fuel ratio learning correction. The air-fuel ratio feedback correction is performed by obtaining an air-fuel ratio feedback correction factor Faf for correcting the fuel injection amount in a feedback manner so that the air-fuel ratio Vaf received from the air-fuel ratio sensor 174 becomes equal to the target air-fuel ratio Vaf*, and multiplying the basic injection amount Tp by the air-fuel ratio feedback correction factor Faf. The air-fuel ratio learning correction is performed by obtaining a learning correction factor Fl for correcting the fuel injection amount so that a median value of the air-fuel ratio feedback correction factor Faf becomes equal to the stoichiometric air-fuel ratio when the median value is biased toward the lean side or rich side, and multiplying the basic injection amount Tp by the learning correction factor Fl. The normal fuel injection amount TAUn resulting from the air-fuel ratio feedback correction and the air-fuel ratio learning correction is expressed by the following Equation (7).

$$TAUn=Faf\times Fl\times Tp \qquad (7)$$

Figure 10:
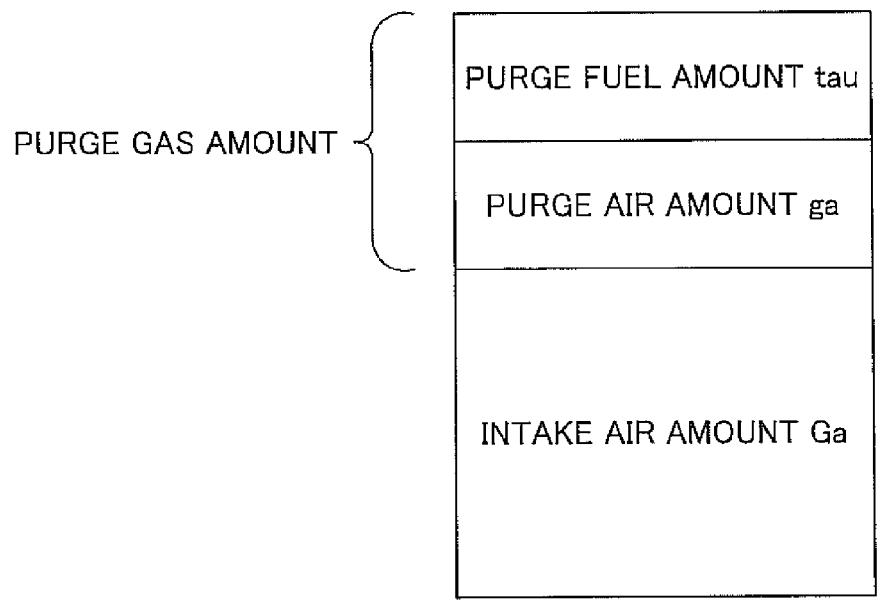
FIG. 10 is an explanatory view showing the relationship between the intake air mass flow Ga and the purge gas flow.

Subsequently, it is determined whether the fuel vapor concentration cf has been calculated (step S330). The fuel vapor concentration cf is a parameter that will be calculated in step S430, and thus will be described in detail later. When the purge execution condition is satisfied for the first time in step S310, the fuel vapor concentration cf has not been calculated. Therefore, a negative decision (NO) is made in step S330, and the control proceeds to step S390 to execute the purge control. More specifically, a target purge rate Rp* is set according to the operating conditions of the engine 22, and the duty ratio D of the purge VSV 166 is set so that the purge rate Rp becomes equal to the target purge rate Rp*. Then, the purge VSV 166 is controlled to be driven at the duty ratio D. The target purge rate Rp* is a target value of the purge rate Rp, and the purge rate Rp is the ratio of the purge gas amount to the intake air amount Ga as the amount of intake air drawn into the intake pipe 120a via the throttle valve 124 per revolution of the engine. FIG. 10 illustrates the relationship between the intake air amount Ga and the purge gas amount. For example, if the air-fuel ratio feedback correction factor Faf and the air-fuel ratio learning correction factor Fl both become close to their rich limits, the target purge rate Rp* decreased by executing the purge control, thereby reducing the duty ratio D of the purge VSV 166 and preventing the air-fuel ratio from becoming excessively rich. If the air-fuel ratio feedback correction factor Faf returns to the lean side, the target purge rate Rp* is increased, thereby increasing the duty ratio D and appropriately purge fuel vapor adsorbed on the canister 160. Namely, the target purge rate Rp* is adjusted based on the air-fuel ratio feedback correction and the air-fuel ratio learning correction, so that the air-fuel ratio feedback control may be implemented without the air-fuel ratio becoming excessively rich.

Subsequently, the intake manifold negative pressure NP is obtained by subtracting a reference atmospheric pressure Pref from the intake manifold pressure PM detected by the intake manifold pressure sensor 148, and the purge gas flow (the amount (mass) of purge gas per unit time) g is obtained based on the intake manifold negative pressure NP and the duty ratio D of the purge VSV 166 (step S400). The reference atmospheric pressure Pref may be set as the intake manifold pressure PM (=the atmospheric pressure) detected by the intake manifold pressure sensor 148 when the engine 22 stops, or may be the pressure value detected by an atmospheric pressure sensor additionally provided for measuring a pressure outside the intake pipe 120a. Then, the total purge gas amount A is updated by adding a value obtained by multiplying the purge gas flow g by an interval time up to the execution of the next cycle of this operation, to the total purge gas amount A obtained in the last cycle (step S410). In addition, the fuel concentration Cf (wt. %) of gas (which will be called "intake-pipe gas") that is present within the intake pipe 120a is obtained, based on the intake manifold pressure PM detected by the intake manifold pressure sensor 148 and an output value of (i.e. the oxygen concentration detected by) the intake-air oxygen sensor 149 (step S420).

Figure 11:
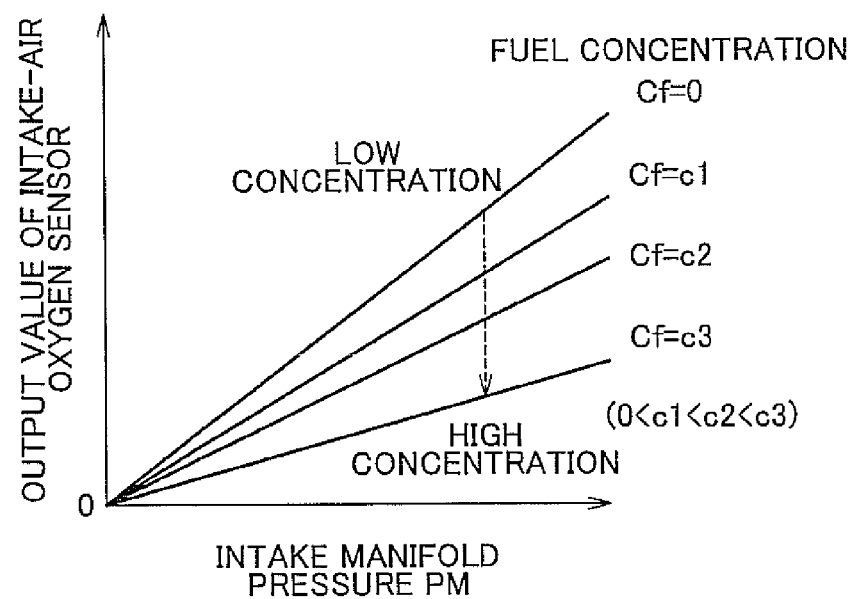
FIG. 11 is an explanatory view showing the relationship between the intake manifold pressure and an output value of an intake-air oxygen sensor.

In this embodiment, the relationships between the intake manifold negative pressure NP and the duty ratio D of the purge VSV 166, and the purge gas flow g, are stored as a map in the ROM 24b. Generally, as the absolute value of the intake manifold negative pressure NP increases, the difference in pressure on the opposite sides of the purge VSV 166, i.e., on the intake pipe 120a side and the canister 160 side, increases, and therefore the purge gas flow g tends to increase. Also, as the duty ratio D of the purge VSV 166 increases, the opening of the purge VSV 166 increases, and therefore the purge gas flow g tends to increase. Thus, the relationships between the intake manifold negative pressure NP and the duty ratio D of the purge VSV 166, and the purge gas flow g, are empirically obtained and stored as a map in the ROM 24b, and the purge gas flow g that corresponds to the intake manifold negative pressure NP and the duty ratio D of the purge VSV 166 is read from the map in step S400. The relationship between the intake manifold pressure PM detected by the intake manifold pressure sensor 148 and the output value of (i.e. oxygen concentration detected by) the intake-air oxygen sensor 149 is represented by a straight line having the largest gradient when the fuel concentration Cf of the intake-pipe gas is equal to zero, and is represented by a straight line whose gradient decreases as the fuel concentration C of the intake-pipe gas increases, as shown in FIG. 11. This relationship is also stored in the ROM 24b. The intake-air oxygen sensor 149 produces an output value proportional to the number of oxygen molecules present on the surface of its sensing element. The number of oxygen molecules present on the surface of the sensing element increases and decreases according to the intake manifold pressure PM. Thus, the output characteristic of the intake-air oxygen sensor 149 will vary with changes in the intake manifold pressure PM. If fuel, such as gasoline, is present in the intake-pipe gas, the fuel and oxygen react with each other on the surface of the sensing element, and the number of oxygen molecules present on the surface of the sensing element decreases. Consequently, the output value of the intake-air oxygen sensor 149 has a tendency to decrease as the fuel concentration Cf of the intake-pipe gas increases, as shown in FIG. 11. Accordingly, the fuel concentration Cf of the intake-pipe gas may be obtained from FIG. 11, based on the intake manifold pressure PM received from the intake manifold pressure sensor 148 and the output value of the intake-air oxygen sensor 149.

After obtaining the purge gas flow g and the fuel concentration Cf in the above manner, the CPU 24a of the engine ECU 24 obtains a purge fuel amount tau, which is the amount of fuel released into the intake pipe 120a during each revolution of the engine, the purge air amount ga, which is the amount of air released into the intake pipe 120a per revolution of the engine, and a fuel vapor concentration cf (step S430). The purge gas consists of fuel vapor adsorbed on the canister 160 and air introduced through the atmosphere inlet 164. Thus, the purge fuel amount tau is expressed by Equation (8) below, and the purge air amount ga is expressed by Equation (9) below, while the fuel vapor concentration cf is expressed by Equation (10) below. Then, the fuel injection amount TAU is set according to Equation (11) below, using the normal fuel injection amount TAUn calculated in step S320, the intake air amount Ga, the purge air amount ga and the purge fuel amount tau (step S440). Namely, because the amount of intake air actually drawn into the engine per revolution of the engine is the sum of the intake air amount Ga and the purge air amount ga, a fuel injection amount commensurate with the sum of Ga and ga is calculated, and the fuel injection amount TAU is set to a value obtained by subtracting the purge fuel amount tau from the calculated fuel injection amount. After the fuel injection amount TAU is set in this manner, the operation of FIG. 9 ends.

$$tau=(g/Ne)\times Cf/100 \quad (8)$$

$$ga=g/Ne-tau \quad (9)$$

$$cf=[tau/(tau+ga)]\times 100 \quad (10)$$

$$TAU=[TAUn\times(Ga+ga)/Ga]-tau \quad (11)$$

If the fuel injection amount setting operation of FIG. 9 is executed again after the purge execution condition is satisfied for the first time in the previous cycle of the operation, the fuel vapor concentration cf has been already calculated, and therefore an affirmative decision (YES) is made in step S330. If an affirmative decision (YES) is made in step S330, it is then determined whether the fuel vapor concentration cf falls within a specified high-concentration range (step S340). An affirmative decision (YES) may be made in step S340 if it is successively determined a certain number of times (e.g., four or five times) that the fuel vapor concentration cf falls within the specified high-concentration range. To determine the high-concentration range, the fuel vapor concentration of purge gas when it is released from the canister 160 into the intake pipe 120a, and the canister 160 is saturated or nearly saturated with fuel vapor, may be determined empirically, and the lower limit of the high-concentration range is set to a value obtained by multiplying the fuel vapor concentration by a factor (<1, for example, 0.9 or 0.8). If it is determined in step S340 that the fuel vapor concentration cf falls within the specified high-concentration range, it is then determined whether the target purge rate Rp* set in purge control falls within a specified high-rate range (step S350). The target purge rate Rp* is a the purge rate Rp set in the purge control of step S390. The purge rate Rp is the ratio of the purge gas amount to the intake air amount Ga drawn into the intake pipe 120a per revolution of the engine. To determine the high-rate range, the maximum value of the purge rate Rp may be determined empirically, and the lower limit of the high-rate range is set to a value obtained by multiplying the maximum value by a factor (<1, for example, 0.9 or 0.8).

If it is determined in step S340 that the fuel vapor concentration cf falls within the high-concentration range and it is determined in step S350 that the target purge rate Rp* falls within the high-rate range, it is determined whether the total purge gas amount A is equal to or below a threshold amount Aref (step S370). The total purge gas amount A is the total amount of purge gas released into the intake pipe 120a while the purge priority flag Fp is set at 1 when the purge control is executed. In this embodiment, the amount of purge gas required to reduce the fuel vapor concentration cf to a value below the high-concentration range may be determined empirically, and the threshold amount Aref is set to a value obtained by adding a margin to the required purge gas amount. If it is determined in step S370 that the total purge gas amount A is equal to or below the threshold amount Aref, the purge priority flag Fp is set to 1 (step S380). Namely, if the fuel vapor concentration cf falls within the high-concentration range and the target purge rate Rp* falls within the high-rate range, a high concentration of fuel vapor are present in the canister 160; therefore, it is necessary to increase the purge gas flow and reduce the fuel vapor in the canister 160 quickly. Thus, the purge priority flag Fp is set to 1. As a result, the purge priority line is selected in the above-described driving control operation. In this case, if the required power Pe* is the same, the fuel efficiency is lower but the engine speed is higher and the torque is lower, as compared with the case where the optimum fuel efficiency line is selected; therefore, the opening of the throttle valve 124 is reduced, and the absolute value of the intake manifold negative pressure increases, which increases the purge gas flow. Accordingly, the purge rate Rp is more likely to reach the target purge rate Rp*, which is a high rate. After the purge priority flag Fp is set to 1, steps S390 to S440 are executed, and the operation of FIG. 9 ends.

If it is determined in step S340 that the fuel vapor concentration cf falls within the high-concentration range, but it is determined in step S350 that the target purge rate Rp* does not fall within the high-rate range, it is determined whether the value of the purge priority flag Fp is 1 (step S360). If it is determined that the value of the purge priority flag Fp is 1, it is then determined whether the total purge gas amount A is equal to or smaller than the threshold amount Aref (step S370), and, if the total purge gas amount A is equal to or smaller than the threshold amount Aref, steps S380 to S440 are executed, and the operation of FIG. 9 ends. Namely, if the fuel vapor concentration cf stays within the high-concentration range after the purge priority flag Fp is set to 1, the purge priority flag Fp remains set at 1 until the total purge gas amount A exceeds the threshold amount Aref, regardless of whether the target purge rate Rp* falls within the high-rate range.

If, on the other hand, it is determined in step S340 that the fuel vapor concentration cf does not fall within the high-concentration range, or it is determined in step S360 that the value of the purge priority flag Fp is 0, or it is determined in step S370 that the total purge gas amount A exceeds the threshold amount Aref, it is deemed unnecessary to increase the purge gas flow, and the purge priority flag Fp is set to 0 while the total purge gas amount A is reset to zero (step S450). Then, steps S390 to S440 are executed, and the operation of FIG. 9 ends. In this case, the optimum fuel efficiency line is selected in the driving control operation, so that the fuel efficiency of the engine 22 is optimized to the greatest extent possible while the purge control is executed. Accordingly, the time at which it is determined in step S340 that the fuel vapor concentration cf does not fall within the high-concentration range substantially coincides with the time at which it is determined in step S370 that the total purge gas amount A is equal to or larger than the threshold amount Aref.

In the hybrid vehicle 20 of this embodiment, when the fuel vapor concentration cf falls within the high-concentration range AND the target purge rate Rp* also falls within the high-rate range (i.e., the purge priority conditions are satisfied), an operating point on the purge priority operating line is selected to increase the absolute value of the intake manifold negative pressure and increase the flow rate of purge gas purged from the canister 160 into the intake pipe 120a, as compared with the case where a corresponding operating point on the optimum fuel efficiency operating line is selected. Therefore, the purge rate Rp is easily controlled to be equal to the target purge rate Rp*, which is a high rate, and fuel vapor trapped in the canister 160 may be immediately released into the intake pipe 120a. On the other hand, if the fuel vapor concentration cf does not fall within the high-concentration range or the total purge gas amount A exceeds the threshold amount Aref (i.e., when a purge priority canceling condition is satisfied), the necessity to immediately purge fuel vapor trapped in the canister 160 into the intake pipe 120a is low; therefore, an operating point on the optimum fuel efficiency operating line is selected so as to keep the engine 22 operating at high fuel efficiency. Thus, when a large amount of fuel vapor is trapped in the canister 160, the fuel vapor may be purged or in a short time, without adversely affecting the fuel economy of the engine 22. If the fuel vapor concentration cf falls within the specified high-concentration range, but the target purge rate Rp* does not fall within the specified high-rate range, the necessity to increase the purge gas flow is not so high; therefore, an operating point on the optimum fuel efficiency operating line is selected, which is advantageous in terms of the fuel economy. Furthermore, because the purge priority operating line or the optimum fuel efficiency operating line are used to obtain a target operating point of the engine 22, the load imposed on the control system is reduced as compared with the case where a purge priority operating point or an optimum fuel efficiency operating point is calculated each time, or the like, without using the above-indicated operating lines.

Figure 12:
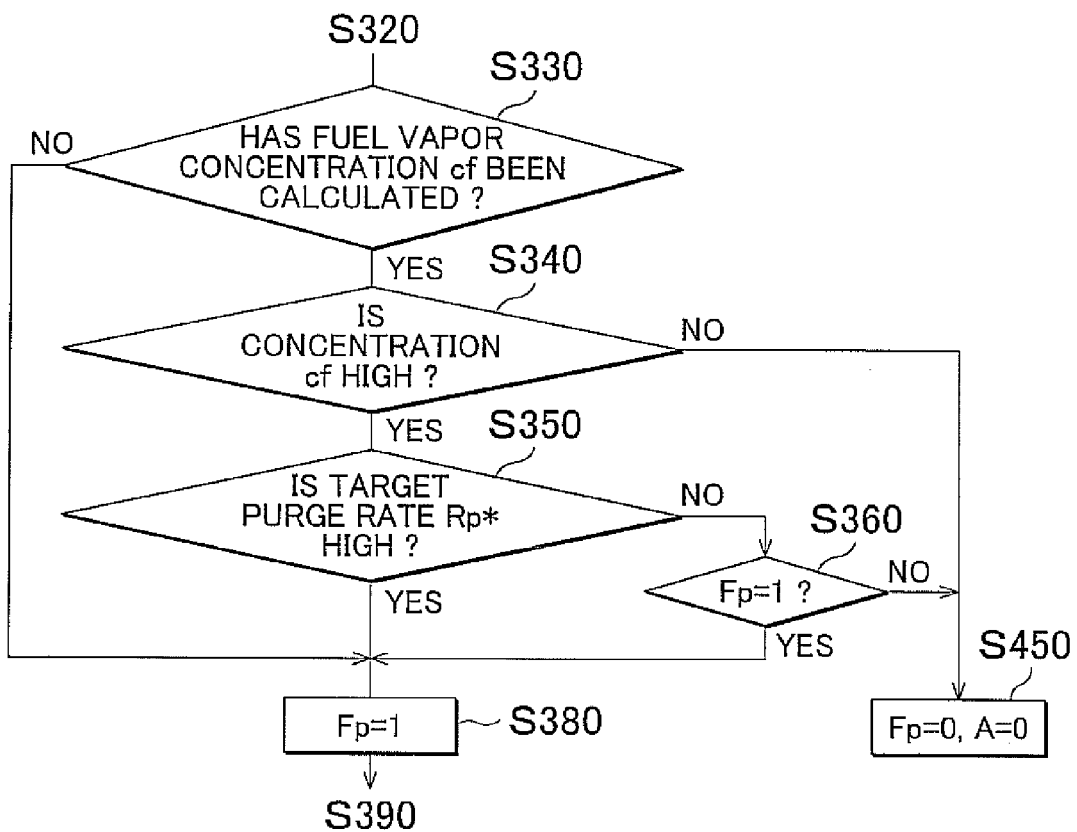
FIG. 12 is a flowchart illustrating a fuel injection amount setting operation of a modified example of the embodiment of FIG. 1.

In the illustrated embodiment, the time at which it is determined in step S340 that the fuel vapor concentration cf does not fall within the high-concentration range after the purge propriety flag Fp is set to 1 substantially coincides with the time at which it is determined in step S370 that the total purge gas amount A exceeds the threshold amount Aref. It follows that the operation of step S370 to determine whether the total purge gas amount A is equal to or below the threshold amount Aref may be omitted, as shown in FIG. 12, and the control may proceed to step S380 if an affirmative decision (YES) is made in step S350 or step S360, to set the purge priority flag Fp to 1.

Figure 13:
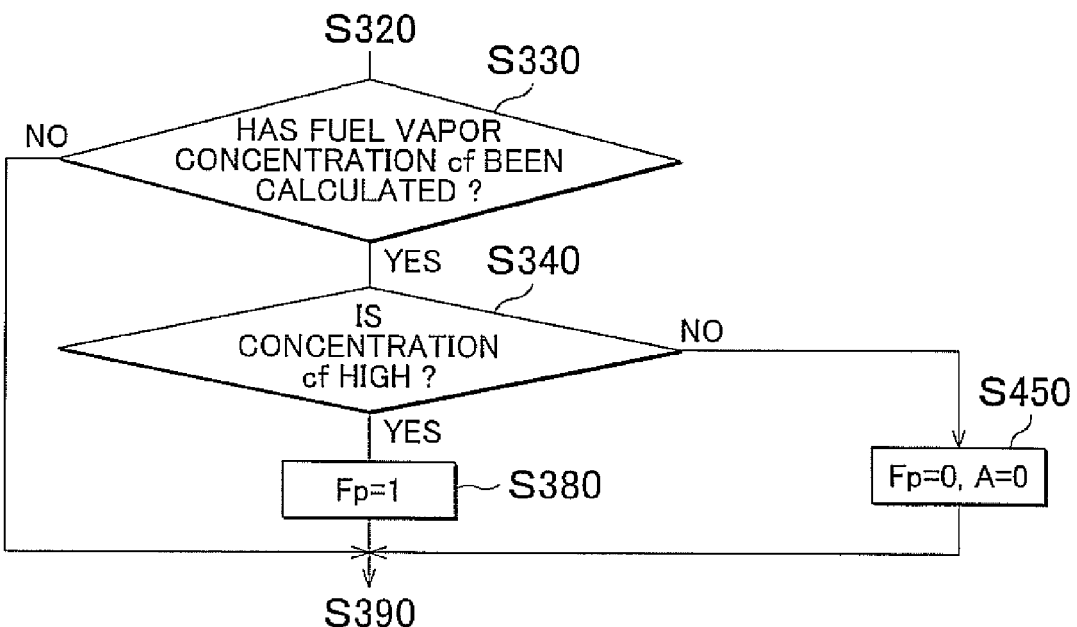
FIG. 13 is a flowchart illustrating the fuel injection amount setting operation of another modified example of the embodiment of FIG. 1.

While the purge priority condition of the illustrated embodiment is that the vapor fuel concentration cf falls within the high-concentration range AND the target purge rate Rp* falls within the high range, the purge priority condition may instead consist solely of a condition that the fuel vapor concentration cf falls within the high-concentration range. Namely, steps S350 to S370 may be omitted, as shown in FIG. 13, and the control may proceed to step S380 to set the purge priority flag Fp to 1 if it is determined in step S340 that the fuel vapor concentration cf falls within the high-concentration region, while the control may proceed to step S450 to set the purge priority flag Fp to 0 if it is determined in step S340 that the fuel vapor concentration cf does not fall within the high-concentration range.

While the fuel vapor concentration cf is used as a parameter associated with the fuel vapor amount in the illustrated embodiment, the amount (e.g., weight) of fuel vapor trapped in the canister 160 may be used in place of the fuel vapor concentration cf.

While the target operating point of the engine 22 is set using the optimum fuel efficiency operating line or the purge priority operating line in the illustrated embodiment, the target operating point may be set without using these operating lines. For example, an optimum fuel efficiency operating point may be set as follows: the engine 22 may be actually operated at a plurality of operating points at which the engine 22 produces the required power, and the fuel efficiencies at the respective operating points may be compared so as to obtain an operating point that provides the highest fuel efficiency, to which the optimum fuel efficiency operating point may be set accordingly. Also, a purge priority operating point may be set as follows: the intake manifold pressure PM may be determined based on the target purge rate Rp* and the duty ratio D (opening) of the purge VSV 166, and the purge priority operating point may be set so as to achieve the intake manifold pressure PM thus determined.

While the fuel concentration Cf of the intake-pipe gas is obtained based on the intake manifold pressure PM and the output value of the intake-air oxygen sensor 149 in the illustrated embodiment, the fuel concentration Cf may be obtained without using the output value of the intake-air oxygen sensor 149. For example, the fuel concentration Cf may be obtained by using the air-fuel ratio Vaf received from the air-fuel ratio sensor 174 after the normal fuel injection amount TAUn is injected. More specifically, the fuel concentration Cf may be obtained so that a value obtained by dividing the sum of the updated intake air amount Ga and purge air amount Ga (refer to Expression (9) above) by the sum of the actual fuel injection amount TAUn and the purge fuel amount tau (refer to Expression (8) above) becomes equal to the air-fuel ratio Vaf. In this case, there is no need to install the intake-air oxygen sensor 149 in the intake pipe 120a.

$$Vaf=(Ga+ga)/(TAUn+tau) \quad (12)$$

Figure 14:
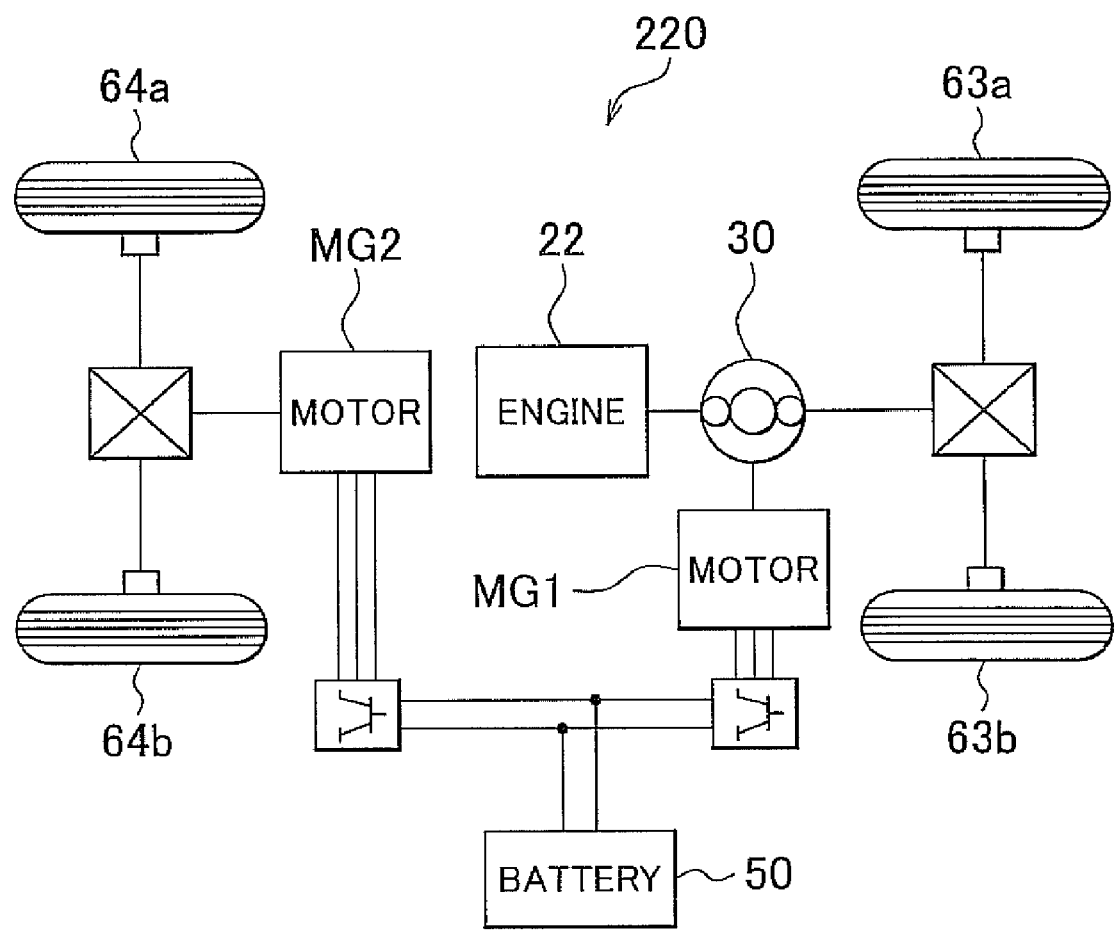
FIG. 14 is a schematic view of the construction of a hybrid vehicle according to a modified example of the embodiment of FIG. 1.

While the power of the motor MG2 is transmitted to the ring gear shaft 32a after its speed is reduced by the reduction gear 35 in the hybrid vehicle 20 of the illustrated embodiment, the power of the motor MG2 may be transmitted to an axle (connected to wheels 64a, 64b in FIG. 14) that is different from an axle (connected to the driving wheels 63a, 63b) to which the ring gear shaft 32a is connected, as shown in the hybrid vehicle 220 illustrated in FIG. 14, which is a modified example of the above embodiment.

While the power output apparatus comprised principally of the engine 22, power distribution/integration mechanism 30, motor MG1, motor MG2, hybrid-system electronic control unit 70, and so forth is installed on the hybrid vehicle (automobile) in the illustrated embodiment, the power output apparatus of this type may be installed on mobile units, such as vehicles other than automobiles, ships and aircraft. Also, the power output apparatus of this type may be incorporated in facilities, such as construction facilities, instead of mobile units. Furthermore, the invention may be embodied as a method of controlling of the power output apparatus.

In the embodiment illustrated above, the engine 22 is one example of the "internal combustion engine"; the fuel tank 168 is one example of the "fuel tank"; the canister 160 is one example of the "fuel vapor trap"; the motor MG2 is one example of the "electric motor"; the three-shaft-type power distribution/integration mechanism 30 is one example of the "input and output device"; the motor MG1 is one example of the "generator"; and the engine ECU 24 that calculates the fuel vapor concentration cf based on signals received from the intake manifold pressure sensor 148 and the intake-air oxygen sensor 149 is one example of the "detector". Also, the ROM 74 of the hybrid-system electronic control unit 70 is one example of the "operating line storage device". The "internal combustion engine" is not limited to internal combustion engines operable to generate power by means of hydrocarbon-base fuels, such as gasoline and light oil, but may be any type of internal combustion engine for which the release of raw fuel vapor to the atmosphere needs be prevented. The "fuel vapor trap" is not limited to the canister 160, but may be of any type provided that the device is operable to trap fuel vapor. The "generator" and "electric motor" are not limited to the motor MG1 and motor MG2 in the form of synchronous generator-motors, but may be of any type. The "input and output device" is not limited to the power distribution/integration mechanism 30 as described above, but may be of any type, provided that the input and output device is connected to three shafts, i.e., a drive shaft, an output shaft and a rotary shaft of a generator, and is configured to supply or receive power to or from one of the three shafts, based on power supplied to or received from the other two shafts. For example, the input and output device may use a double-pinion type planetary gear train or a combination of two or more planetary gear trains connected to four or more shafts, or may be operable, like a differential gear, in a differential fashion different from those of planetary gears. The "detector" is not limited to the engine ECU 24 that calculates the fuel vapor concentration cf based on signals received from the intake manifold pressure sensor 148 and the intake-air oxygen sensor 149, but may be configured to calculate the fuel vapor concentration cf, for example, based on the deviation of the air-fuel ratio Vaf received from the air-fuel ratio sensor 174 after the fuel amount calculated from the intake air amount and the target air-fuel ratio Vaf* is injected from the fuel injection valve 126, from the target air-fuel ratio Vaf*. While a single CPU may serve as the "controller" to set the required power and the target operating point, two or more CPUs may be assigned respective control operations. Also, a single CPU may serve as the "controller" for controlling the internal combustion engine, electric motor and generator in addition to controlling execution of the purge control. Alternatively, or two or more CPUs may be assigned one or more control operations as appropriate.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations other combinations and configurations, including more, less or only a single element, are also within the scope of the invention.

It is claimed:

1. A method of controlling of a power output apparatus, which is implemented by computer software, wherein the power output apparatus includes an internal combustion engine, a fuel tank in which fuel supplied to the internal combustion engine is stored, a fuel vapor trap that traps fuel vapor in the fuel tank, and purges the trapped fuel vapor into an intake pipe of the internal combustion engine, an electric motor that outputs power to a drive shaft, a three-shaft power input and output device that is connected to three shafts comprising an output shaft of the internal combustion engine, the drive shaft and a rotary shaft, and supplies or receives power to or from one of the three shafts, based on power supplied to or received from the remaining two of the three shafts, a generator that generates electric power using the power received via the rotary shaft, and a fuel vapor parameter detector that detects a parameter associated with a fuel vapor amount as an amount of fuel vapor trapped in the fuel vapor trap, said method comprising:

setting a required power that is transmitted to the drive shaft;

setting a target operating point of the internal combustion engine to a purge priority operating point, at which the internal combustion engine generates the same power as when the engine operates at an optimum fuel efficiency operating point, at which the engine operates at optimum fuel efficiency, but operates at a higher rotational speed with smaller torque, when a purge priority condition that comprises at least a condition that the parameter associated with the fuel vapor amount that is detected by the detector falls within a specified high-fuel-amount range is satisfied;

setting the target operating point of the internal combustion engine to the optimum fuel efficiency operating point when a purge priority canceling condition is satisfied after the target operating point of the internal combustion engine is set to the purge priority operating point; and controlling the internal combustion engine, the electric motor and the generator, based on the set required power and the target operating point of the internal combustion engine and executing purge control to purge the fuel vapor trapped by the fuel vapor trap into the intake pipe, utilizing a negative pressure of the intake pipe.

2. A power output apparatus comprising:

an internal combustion engine;

a fuel tank in which fuel supplied to the internal combustion engine is stored;

a fuel vapor trap that traps fuel vapor in the fuel tank, and purges the trapped fuel vapor into an intake pipe of the internal combustion engine;

an electric motor that outputs power to a drive shaft;

a three-shaft power input and output device that is connected to three shafts comprising an output shaft of the internal combustion engine, the drive shaft and a rotary shaft, and supplies or receives power to or from one of the three shafts, based on power supplied to or received from the remaining two of the three shafts;

a generator that generates electric power using the power received via the rotary shaft;

a fuel vapor parameter detector that detects a parameter associated with a fuel vapor amount as an amount of fuel vapor trapped in the fuel vapor trap;

a required power setting device that sets a required power to be transmitted to the drive shaft;

a target operating point setting device for setting a target operating point of the internal combustion engine to a purge priority operating point, at which the internal combustion engine generates the same power as when the engine operates at an optimum fuel efficiency operating point, at which the engine operates at optimum fuel efficiency, but operates at a higher rotational speed with smaller torque, when a purge priority condition that comprises at least a condition that the parameter associated with the fuel vapor amount and detected by the detector falls within a specified high-fuel-amount range is satisfied, and setting the target operating point of the internal combustion engine to the optimum fuel efficiency operating point when a certain purge priority canceling condition is satisfied, after the target operating point of the internal combustion engine is set to the purge priority operating point; and a controller that controls the internal combustion engine, the electric motor and the generator, based on the set required power and the target operating point of the internal combustion engine, and executes a purge control for releasing the fuel vapor trapped by the fuel vapor trap into the intake pipe, utilizing a negative pressure of the intake pipe.

3. The power output apparatus according to claim 2, wherein the purge priority condition comprises at least a condition that the parameter associated with the fuel vapor amount and detected by the detector falls within the specified high-fuel-amount range, and a ratio of a purge gas flow to an intake air flow falls within a specified high-ratio range.

4. The power output apparatus according to claim 2, wherein the purge priority canceling condition comprises at least a condition that a total purge gas amount calculated from the time when the target operating point of the internal combustion engine is set to the purge priority operating point falls within a specified large-amount range.

5. The power output apparatus according to claim 2, wherein the purge priority canceling condition comprises at least a condition that the parameter associated with the fuel vapor amount and detected by the detector does not fall within the specified high-fuel-amount range.

6. The power output apparatus according to claim 2, wherein the detector detects a fuel concentration in purge gas as the parameter associated with the fuel vapor amount.

7. The power output apparatus according to claim 2, further comprising an operating line storage device that stores an optimum fuel efficiency line, on which the internal combustion engine operates at optimum fuel efficiency, and a purge priority line, as operating lines used to set an operating point representing the rotational speed and torque of the internal combustion engine, wherein the internal combustion engine operates at a higher rotational speed with smaller torque at a given operating point on the purge priority operating line so as to generate a certain power, as compared with those of the engine operating at a given operating point on the optimum fuel efficiency operating line so as to generate the same power, and wherein the target operating point setting device sets the target operating point of the internal combustion engine to an operating point on the purge priority line when the purge priority condition is satisfied, and sets the target operating point of the internal combustion engine to an operating point on the optimum fuel efficiency line when the purge priority canceling condition is satisfied.

8. A vehicle on which the power output apparatus according to claim 2 is installed, and which has an axle coupled to the drive shaft.

\* \* \* \* \*